US012731326B2

(12) United States Patent
Conant et al.

(10) Patent No.: US 12,731,326 B2
(45) Date of Patent: Sep. 8, 2026

(54) GEMSTONE CUT ANALYSIS

(71) Applicant: Gemological Institute of America, Inc. (GIA), Carlsbad, CA (US)

(72) Inventors: James Conant, Escondido, CA (US); Jason Quick, Las Vegas, NV (US); Ilene Miller Reinitz, Chicago, IL (US); Brock Aaron Wilke, Henderson, NV (US); Alexander Abraham Balter, Livingston, NJ (US); Troy Blodgett, Dartmouth, MA (US); Abhijith Prabhu, Las Vegas, NV (US); Al Gilbertson, Carlsbad, CA (US); Jacob Ressler-Craig, Las Vegas, NV (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 149 days.

(21) Appl. No.: 18/671,315

(22) Filed: May 22, 2024

(65) Prior Publication Data

US 2024/0394961 A1 Nov. 28, 2024

Related U.S. Application Data

(60) Provisional application No. 63/468,226, filed on May 22, 2023, provisional application No. 63/468,242, filed on May 22, 2023.

(51) Int. Cl.
*G06T 15/50* (2011.01)
*B24B 9/16* (2006.01)
(Continued)

(52) U.S. Cl.
CPC .............. *G06T 15/506* (2013.01); *B24B 9/16* (2013.01); *B24B 51/00* (2013.01); *B28D 5/00* (2013.01);
(Continued)

(58) Field of Classification Search
CPC ....... G06T 15/06; G06T 15/50; G06T 15/506; G06T 17/00; G01N 21/87
See application file for complete search history.

(56) References Cited

U.S. PATENT DOCUMENTS

2007/0083382 A1 4/2007 Reinitz et al.
2010/0250201 A1* 9/2010 Sivovolenko ...... G01B 11/2433 703/2

(Continued)

OTHER PUBLICATIONS

Gem Cut Studio User's Manual. Gem Cut Studio. (2017). Retrieved from http://www.gemcutstudio.com/app_download/UserManual_v110.pdf on Dec. 12, 2025. (Year: 2017).*

(Continued)

*Primary Examiner* — Ryan McCulley
(74) *Attorney, Agent, or Firm* — DLA PIPER LLP (US); Blake W. Jackson; Thomas J. Fuller

(57) ABSTRACT

The present embodiments relate to methods and systems for analyzing and representing diamond appearance, and to an interactive, web-based encyclopedia of diamond cuts. The analytical methods involve the use of several unique techniques designed to capture and represent the nuances of different diamond cuts precisely. The graphical representations translate this complex gemological data into a format that is accessible and understandable to non-expert users. The diamond cut encyclopedia, generated by a unique enumeration algorithm, provides a comprehensive and detailed resource for both experts and enthusiasts alike. The present embodiments present a significant advancement in the field of gemology, offering increased precision in diamond analysis, user-friendly interfaces, and an efficient method for creating a comprehensive, interactive diamond cut encyclopedia.

20 Claims, 17 Drawing Sheets
(13 of 17 Drawing Sheet(s) Filed in Color)

(51) Int. Cl.

| | |
|---|---|
| ***B24B 51/00*** | (2006.01) |
| ***B28D 5/00*** | (2006.01) |
| ***G06T 7/50*** | (2017.01) |
| ***G06T 7/60*** | (2017.01) |
| ***G06T 11/26*** | (2026.01) |
| ***G06T 13/20*** | (2011.01) |
| ***G06T 15/06*** | (2011.01) |
| ***G06T 17/00*** | (2006.01) |

(52) U.S. Cl.

CPC .................. *G06T 7/50* (2017.01); *G06T 7/60* (2013.01); *G06T 11/26* (2026.01); *G06T 13/20* (2013.01); *G06T 15/06* (2013.01); *G06T 17/00* (2013.01); *G06T 2200/24* (2013.01); *G06T 2207/20072* (2013.01)

(56) References Cited

U.S. PATENT DOCUMENTS

| | | | |
|---|---|---|---|
| 2014/0033765 | A1 | 2/2014 | Holloway et al. |
| 2014/0067331 | A1 | 3/2014 | Benjano |
| 2014/0107986 | A1 | 4/2014 | Sivovolenko |
| 2019/0037980 | A1 | 2/2019 | Maltezos et al. |
| 2020/0057001 | A1 | 2/2020 | Kerner et al. |
| 2021/0390330 | A1 | 12/2021 | Kerner et al. |
| 2022/0349830 | A1 | 11/2022 | Hong |
| 2024/0096227 | A1 * | 3/2024 | Iwaki ...................... G06T 15/20 |

OTHER PUBLICATIONS

Erickson et al., "A Toroidal MaxwellCremonaDelaunay Correspondence," arXiv, Feb. 5, 2022, [Retrieved on Sep. 21, 2024] Retrieved from URL: https://arxiv.org/abs/2003.10057.

International Search Report and Written Opinion for International Application No. PCT/US2024/30578, dated Oct. 18, 2024, 10 Pages.

International Search Report and Written Opinion for International Application No. PCT/US2024/30638, dated Oct. 16, 2024, 12 Pages.

Mol, et al., "Efficiency Parameters Estimation in Gemstones Cut Design using Artificial Neural Networks," Computational Materials Science, Feb. 2007, vol. 38, No. 4, pp. 727-736, [Retrieved on Sep. 21, 2024] Retrieved from URL: https://www.researchgate.net/publication/229381036.

* cited by examiner

100

200

400

600

900

1000

1300

1400

1500

1700

1800

GEMSTONE CUT ANALYSIS

CROSS-REFERENCE TO RELATED APPLICATIONS

This application claims priority to U.S. Provisional Patent Application No. 63/468,242, titled “DIAMOND CUT ANALYSIS,” and filed May 22, 2023, and U.S. Provisional Patent Application No. 63/468,226, titled “GENERATION OF GEM CUTS,” and filed May 22, 2023, the entirety of which are incorporated by reference herein.

FIELD

The field includes analysis and graphical representation of a diamond or other gemstone appearance including light interaction simulations. Furthermore, the field relates to methods and representations in an interactive web-based encyclopedia for diamond cuts as well as for consumer-facing reports.

BACKGROUND

Diamonds and other gemstones are generally evaluated based on their Cut, Color, Clarity, and Carat weight, commonly referred to as the Four Cs. The cut of a diamond can have a significant impact on its brilliance, scintillation, and fire, and is often considered the most complex and technically difficult criterion to assess.

There is a need for a robust, precise, and consumer-friendly method of analyzing and representing diamond appearance in a model or simulation which may be interactive or customizable. In particular, there is a need for a system that can translate complex gemological data into a format that is easily accessible and understandable to the average consumer, while still providing a level of detail and precision that is useful for professionals in the field.

Given the plurality of possible diamond faceting arrangements, and the various technologies available for modeling and precise cutting, an atlas of possible diamond cuts can be very useful in diamond modeling and cutting. In many cases, experimentation with different diamond cuts was hampered by the difficulty in executing some cuts precisely, and by the risk involved with cutting a diamond whose performance was difficult to predict.

Limitations of other solutions include cut grade systems that may work well for a standard round brilliant cut, as well as methodologies that are tailored to some of the most common faceting arrangements. However, developing a cut grading/information system that fits every diamond cut is a challenging proposition. Also, other systems often do not provide a user-friendly interface or format for non-expert users, limiting their usefulness for consumers or amateur enthusiasts.

Moreover, while there are numerous resources available for learning about diamond cuts, there is no comprehensive, interactive, web-based encyclopedia dedicated to this subject. Other resources often provide only basic information and do not offer the level of detail or interactivity needed to fully understand and appreciate the complexities of diamond cuts. Additionally, the generation of such an encyclopedia would traditionally be a manual, time-consuming process. There is a need for a more efficient, automated method for creating a comprehensive, interactive diamond cut encyclopedia.

SUMMARY

Systems and methods here may include generating virtual facet models of a gemstone, at a computer with a processor and memory, receiving a 3D model file of a gemstone scan including facets, receiving, by the computer, a first user input regarding a first light source position in relation to the 3D model, determining, by the computer, a first group of illuminated virtual facets and first exit beam data from a ray trace or beam trace analysis of the 3D model file and chosen lighting environment, which consists of an assignment of colors and/or intensities to individual points on a surrounding hemisphere. Then causing the display of the virtual facet pattern, with virtual facets colored and/or illuminated via the exit beam data and lighting environment. Additionally or alternatively, causing display, by the computer, of an animated sequence of virtual facet patterns corresponding to a sequence of lighting environments. This could for example model a moving light source, or a more general animation of such as colored rings moving concentrically away from the hemisphere’s pole. This can also be used to encode information about incoming light rays based on angle above the horizon, or other criteria.

In some examples, additionally or alternatively, systems and methods described here may be used for reproducing targeted virtual facets in a gemstone, including a hemispherical shell configured to house a gemstone, the hemispherical shell including an array of multiple lights positioned in different places within the hemispherical shell, configured to illuminate the housed gemstone from different angles, a computer with a processor and memory in communication with the array of multiple lights positioned in different places within the hemispherical shell, the computer configured to turn on and off any of the array of multiple lights to generate virtual facet patterns in the housed gemstone.

In an example embodiment, additionally or alternatively, a method for generating virtual facet models of a gemstone, can include, at a computer with a processor and memory, receiving a 3D model file of a gemstone scan including facets. The method can also include receiving, by the computer, a user input regarding a lighting environment in relation to the 3D model which may consist of a single or multiple tinted or white light sources, or an arbitrary assignment of light intensities and colors to an ideal hemisphere surrounding the virtual model. The method can also include determining, by the computer, the color and illumination of virtual facets via exit beam data from a ray trace or beam trace analysis of the 3D model file and lighting environment. The method can also include causing display, by the computer, of the virtual facet illuminations and/or colors on a user interface showing the 3D model.

In some instances, additionally or alternatively, the method can include causing display, by the computer, of an animation of the colored and/or illuminated virtual facet pattern based on a sequence of lighting environments. This could for example model a moving light source, or a more general animation of such as colored rings moving concentrically away from the hemisphere’s pole.

In some instances, additionally or alternatively, the lighting environment represents a full illumination of the hemisphere surrounding the diamond, with a selected darkened portion to model obscuration and contrast.

In some instances, additionally or alternatively, the method can include, by the computer, analyzing contrast prominence of the virtual facets.

In another example embodiment, additionally or alternatively, a system for reproducing targeted virtual facets in a real gemstone is described. The system can include a hemispherical shell configured to house a gemstone. The hemispherical shell can include an array of multiple lights positioned in different places within the hemispherical shell, configured to illuminate the housed gemstone from different angles. The system can also include a computer with a processor and memory in communication with the array of multiple lights positioned in different places within the hemispherical shell, the computer configured to turn on and off any of the array of multiple lights to generate virtual facet patterns in the housed gemstone.

In another example embodiment, additionally or alternatively, a method for generating virtual facet models of a gemstone is provided. The method can include, at a computer with a processor and memory, receiving a 3D model file of a gemstone scan including facets. The method can also include determining, by the computer, a virtual facet pattern and first exit beam data from a ray trace or beam trace analysis of the 3D model file and input viewing direction. The method can also include causing display, by the computer, of the determined virtual facet pattern on a user interface showing the 3D model and determined virtual facet pattern.

In some instances, additionally or alternatively, the virtual facet pattern being created is aligned to a selected angle of visual perception by utilizing facet depth information.

In some instances, additionally or alternatively, the virtual facet pattern being created is aligned to a selected angle of visual perception by utilizing actual virtual facet size.

In some instances, additionally or alternatively, the virtual facet pattern being created is aligned to a selected angle of visual perception by utilizing angles from which the virtual facet draws light.

In some instances, additionally or alternatively, the method can include causing, by the computer, display of virtual facet elaborations including virtual facets colored according to area, virtual facets colored according to beam depth, virtual facet edges colored by type, virtual facets colored according to girdle interactions.

In some instances, additionally or alternatively, the method can include, by the computer, calculating a set of metrics from the determined virtual facet pattern and the first determined exit beam information, the set of metrics including any of light return, scintillation probability, virtual facet area distribution, virtual facet depth distribution, optical entropy, sparkle spread, graph Isomorphism class of the virtual facet pattern, Hausdorff distance of the virtual facet pattern to a specified graph, and/or graph edit distance of the virtual facet pattern to a specified graph.

In some instances, additionally or alternatively, the method can include using the calculated metrics to produce content for a diamond encyclopedia of multiple metrics by automatically generating a list of faceting arrangements up to a certain complexity, using the enumeration algorithm, auto-populating with best guess proportion sets and displaying the charts and interactive content, and creating an interface for the user to adjust proportion sets and display newly calculated charts.

In another example embodiment, additionally or alternatively, a system for reproducing targeted virtual facets in a real gemstone is provided. The system can include a hemispherical shell configured to house a gemstone. The hemispherical shell can include an array of multiple lights positioned in different places within the hemispherical shell, configured to illuminate the housed gemstone from different angles. The system can also include a computer with a processor and memory in communication with the array of multiple lights positioned in different places within the hemispherical shell. The computer can be configured to turn on and off any of the array of multiple lights to generate virtual facet patterns in a gemstone housed in the hemispherical shell.

In another example embodiment, additionally or alternatively, a method for generating virtual facet models of a gemstone is provided. The method can include receiving, at a computer with a processor and memory, data regarding a scanned gemstone. The method can also include generating, by the computer, using the received scanned gemstone data, a 3D gemstone model.

The method can also include receiving, by the computer, additionally or alternatively, a user input regarding a lighting environment selection in relation to the 3D model and colors to an ideal hemisphere surrounding the virtual model. The method can also include determining, by the computer, color and illumination of facets using models of exit beam data within the 3D model file and a ray trace analysis of the 3D model file and user input lighting environment selection. The method can also include causing display, by the computer, of virtual facet illuminations or facet colors on a user interface showing the 3D model.

In some instances, additionally or alternatively, the lighting environment selection is at least one of a single or multiple tinted, or white light sources, or an arbitrary assignment of light intensities.

In some instances, additionally or alternatively, the method can include causing display, by the computer, of an animation of the virtual facet illuminations or facet colors based on a programmed sequence of lighting environments.

In some instances, additionally or alternatively, the programmed sequence of lighting environments includes at least one of a model of a moving light source, or a model of colored rings moving concentrically away from a hemisphere pole of the model.

In some instances, additionally or alternatively, the lighting environment selection models a full illumination of a hemisphere surrounding the gemstone model with a selected darkened portion to model obscuration and contrast.

In some instances, additionally or alternatively, the method can include, by the computer, analyzing contrast prominence of virtual facets in the 3D model using the models of exit beam data.

In another example embodiment, additionally or alternatively, a method for generating virtual facet models of a gemstone is provided. The method can include receiving, at a computer with a processor and memory, data regarding a scanned gemstone. The method can also include generating, by the computer, using the received scanned gemstone data, a 3D gemstone model. The method can also include determining, by the computer, a virtual facet pattern and first exit beam data from a ray trace or beam trace analysis of the 3D gemstone model and input viewing direction. The method can also include causing display, by the computer, of the determined virtual facet pattern on a user interface showing the 3D model and determined virtual facet pattern.

In some instances, additionally or alternatively, the determined virtual facet pattern is aligned to a selected angle of visual perception by utilizing facet depth information.

In some instances, additionally or alternatively, the determined virtual facet pattern is aligned to a selected angle of visual perception by utilizing actual virtual facet size from the 3D model.

In some instances, additionally or alternatively, the determined virtual facet pattern is aligned to a selected angle of visual perception by utilizing angles from the 3D model from which the virtual facet draws light.

In some instances, additionally or alternatively, the method can include, causing, by the computer, display of virtual facet elaborations.

In some instances, additionally or alternatively, facet elaborations include at least one of, virtual facets colored according to area, virtual facets colored according to beam depth, virtual facet edges colored by type, or virtual facets colored according to girdle interactions.

In some instances, additionally or alternatively, the method can include, by the computer, calculating a set of metrics from the determined virtual facet pattern and the first determined exit beam data, the set of metrics including at least one of, light return, scintillation probability, virtual facet area distribution, virtual facet depth distribution, optical entropy, sparkle spread, graph Isomorphism class of the virtual facet pattern, Hausdorff distance of the virtual facet pattern to a specified graph, or graph edit distance of the virtual facet pattern to a specified graph.

In some instances, additionally or alternatively, the method can also include using the calculated metrics to produce multiple diagrams of virtual facet patterns by generating a list of faceting arrangements by complexity, using an enumeration algorithm, determining best proportion prediction sets, causing display of charts of the multiple diagrams of virtual facet patterns, and receiving instructions to adjust proportion sets of the virtual facet patterns, and causing display of charts based on the received instructions.

In another example embodiment, additionally or alternatively, a method for generating gemstone models is provided. The method can include receiving input regarding gemstone parameters, wherein gemstone parameters at least include one of light return, contrast prominence, or optical entropy. The method can also include utilizing an algorithm and the input parameters to generate gemstone models, wherein the algorithm is at least one of a Constrained Optimization by Linear Approximation (COBYLA) algorithm, a genetic algorithm, or a Machine Learning technique.

In another example embodiment, additionally or alternatively, a method to determine contrast prominence in a gemstone model is provided. The method can also include receiving, at a computer with a processor and memory, data regarding a scanned gemstone. The method can also include generating, by the computer, using the received scanned gemstone data, a 3D gemstone model. The method can also include by the computer, generating ray tracing data on the 3D gemstone model. The method can also include by the computer, generating a virtual facet decomposition from the generated ray tracing data from multiple angles. The method can also include by the computer, calculating an angle of incoming light rays with a horizon for each virtual facet for each ray trace, using geometry of the model and refraction and reflection data.

In some instances, additionally or alternatively, the method can also include, by the computer, returning for each ray trace, a total percentage area of obscured facets and generating an obscuration score.

In another example embodiment, additionally or alternatively, a method to generate a sparkle spread map for a gemstone model is provided. The method can include receiving, at a computer with a processor and memory, data regarding a scanned gemstone. The method can also include generating, by the computer, using the received scanned gemstone data, a 3D gemstone model. The method can also include receiving, by the computer, selection of an angular radius. The method can also include generating, by the computer, a pixelated image of the 3D gemstone model. The method can also include assigning, by the computer, a color to each pixel of the 3D gemstone model pixelated image, based on a modeled light source from the angular radius, and a calculated relative area of a convex hull of illuminated facets.

In some instances, additionally or alternatively, the colors are linear gradients from 0 to 1 wherein 0 is no virtual facet illumination and 1 is maximum virtual facet illumination.

In another example embodiment, additionally or alternatively, a method to generate a sparkle spread map for a gemstone model. The method can include receiving, at a computer with a processor and memory, data regarding a scanned gemstone. The method can also include generating, by the computer, using the received scanned gemstone data, a 3D gemstone model. The method can also include, by the computer, beam tracing the 3D gemstone model. The method can also include, by the computer, generating a digital image of a hemisphere surrounding the 3D gemstone model in a face down configuration. The method can also include receiving, by the computer, an angular radius for a modeled light source. The method can also include assigning a color, by the computer, to each pixel in the digital image, based on calculated virtual facet exit beams from the received angular radius, and a convex hull of virtual facet centroids.

In some instances, additionally or alternatively, the method can include, by the computer, determining a relative area of the convex hull with respect to a total visible area of the 3D gemstone model.

In some instances, additionally or alternatively, the method can include, by the computer, assigning a color code to each pixel using a linear gradient from 0 to 1.

In some instances, additionally or alternatively, the method can include, by the computer, plotting a total area to produce a heat map of light source visibility across a surface of the 3D gemstone model.

In some instances, additionally or alternatively, the method can include, by the computer, plotting a number of virtual facets that are illuminated in the 3D gemstone model and producing a heat map of sparkle quantity as a function of light source position.

In another example embodiment, additionally or alternatively, a method to generate a visualization of a gemstone model is described. The method can include receiving, at a computer with a processor and memory, data regarding a scanned gemstone. The method can also include generating, by the computer, using the received scanned gemstone data, a 3D gemstone model. The method can also include, by the computer, beam tracing a set of modeled beams through the generated 3D gemstone model. The method can also include, by the computer, calculating virtual facets within the 3D gemstone model using the beam tracing. The method can also include, by the computer, assigning a color to each calculated virtual facet in the 3D gemstone model based on relative size. In some instances, the method can include, by the computer, causing display of the virtual facets and colors. In some instances, the method can include, by the computer, causing display of percentage areas of categories of sizes of virtual facets. In some instances, the method can include, by the computer, causing display of a graph of counts of categories of sizes of virtual facets.

In another example embodiment, additionally or alternatively, a method of mapping optical entropy in a gemstone model is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include generating a score for each virtual facet using areas of virtual facets in the 3D gemstone model and the beam tracing, including generating dot products of exit beams for each virtual facet with exit beams of neighboring virtual facets.

In some instances, additionally or alternatively, the method can include, by the computer, assigning a color to each virtual facet based on the beam tracing and categorization of direction of beam tracing.

In some instances, additionally or alternatively, the method can include, by the computer, generating a continuous color gradient based on the score of each virtual facet and causing display of the color gradient with a display of the 3D gemstone model.

In another example embodiment, additionally or alternatively, a method of generating a gemstone model is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include causing display of the 3D gemstone model and beam tracing. The method can also include highlighting every virtual facet that has a light path that interacts with girdle facets of the 3D gemstone model.

In another example embodiment, additionally or alternatively, a method of generating a virtual gemstone facet isomorphism map is provided. The method can include receiving, at a computer with a processor and memory, data regarding a scanned gemstone. The method can also include generating, by the computer, using the received scanned gemstone data, a 3D gemstone model. The method can also include generating, by the computer, variations of the 3D gemstone model with different proportions. The method can also include beam tracing, by the computer, the 3D gemstone model and generated variations of the 3D gemstone model using geometry, refraction and reflection rules. The method can also include segmenting space of all virtual facet patterns in the 3D gemstone model and variations of the 3D gemstone model, into virtual facet types. The method can also include causing display of a map of the virtual facet types for the 3D gemstone model and variations of the 3D gemstone model.

In some instances, additionally or alternatively, the different proportions are at least one of crown height, pavilion depth, table size, or contour parameter.

In some instances, additionally or alternatively, the map of the virtual facet types is a map of regions colored by isomorphism type.

In some instances, additionally or alternatively, the map of the virtual facet types is a 3D plot colored by isomorphism type.

In another example embodiment, additionally or alternatively, a method of modeling a gemstone boundary is provided. The method can include receiving, at a computer with a processor and memory, data regarding a scanned gemstone. The method can also include generating, by the computer, using the received scanned gemstone data, a 3D gemstone model. The method can also include generating, by the computer, a 2D picture of the 3D gemstone model using an alignment routine best fit axes of symmetry to align the gemstone. The method can also include fitting, by the computer, Bezier curves to four quadrants of the 3D gemstone model defined by parameters kappa, theta, and mu.

The method can also include determining, by the computer, additionally or alternatively, characteristics of a shape outline of the 3D gemstone model using the as input, wherein the characteristics of the shape are fit into categories of slim, standard, or broad. The method can also include assigning color parameters to the categories.

In some instances, the method can include, by the computer, additionally or alternatively, causing display of the 3D gemstone model with the assignment color parameters to the shape outline.

In another example embodiment, additionally or alternatively, a method of generating a sparkle spread map of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include causing display, by the computer, of a digital pixelated image of a hemisphere surrounding the 3D gemstone model with the 3D gemstone model in a face down orientation. The method can also include receiving, by the computer, a selection of an angular radius in degrees for a modeled light source. The method can also include analyzing, by the computer, each virtual facet exit beam of the 3D gemstone model that intersects with a chosen pixel of the digital pixelated image, using the selected angular radius. The method can also include determining, by the computer, convex hulls of centroids of the virtual facets in the 3D gemstone model. The method can also include determining, by the computer, relative area of the convex hulls with respect to total visible area of the 3D gemstone model. The method can also include assigning, by the computer, color codes to the chosen pixel using the convex hulls.

In some instances, additionally or alternatively, the color codes are from 0 to 1 based on illumination.

In some instances, additionally or alternatively, the method can include, by the computer, generating a heat map of visible light on a total area of the 3D gemstone model.

In some instances, additionally or alternatively, the method can include, by the computer, generating a sparkle quantity plot of number of virtual facets that are illuminated of the 3D gemstone model.

In another example embodiment, additionally or alternatively, a method of virtual facet edge coloring of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include recording, by the computer, clipping edge data for any polygonal regions in the 3D gemstone model during beam tracing. The method can also include assigning, by the computer, color coding for edge types. The method can also include creating, by the computer, an edge-coded diagram using the color coding.

In some instances, additionally or alternatively, the edge types range from table to girdle.

In some instances, additionally or alternatively, the method can include, by the computer, causing display of a virtual facet diagram of the 3D gemstone model that incorporates the color coding.

In another example embodiment, a method of contrast/sparkle analysis of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include generating, by the computer, a virtual facet pattern model and causing display of the virtual facet pattern model. The method can also include, by the computer, receiving selection of a virtual facet in the virtual pattern model. The method can also include, by the computer, receiving selection of color for the selected virtual facet. The method can also include generating, by the computer, a single frame of a scintillation movie using the selected color and the 3D gemstone model beam tracing. The method can also include causing storage of the single frame of the scintillation movie. The method can also include repeating receiving by the computer, virtual facet selection and color selection. The method can also include generating, by the computer, a unique sequence of lighting configurations in a hemisphere surrounding the 3D gemstone model and a series of additional frames of the scintillation movie. The method can also include causing display of the first frame of the scintillation movie and the series of additional frames of the scintillation movie.

In some instances, additionally or alternatively, the method can include sending instructions to a hemisphere light system based on the scintillation movie data to illuminate a gemstone.

In another example embodiment, additionally or alternatively, a method of determining outline characteristics of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include determining, by the computer, a 2D shadow of the 3D model. The determining can include selecting a symmetry axis with minimum area, computing an area of a convex hull for each axis, for a shadow and reflection, and iterating over potential symmetry axes.

The method can also include rotating, by the computer, additionally or alternatively, the 3D gemstone model to a horizontal axis. The method can also include fitting, by the computer, Bezier curves to four quadrants of the 3D gemstone model. The method can also include determining, by the computer, length to width ratio as a difference in maximum and minimum x coordinates in the 3D gemstone model, divided by a difference in maximum and minimum y coordinates.

In some instances, additionally or alternatively, for oval gemstone models, control points for the Bezier curve are positioned a constant fraction kappa of the width and height of the outline.

In some instances, additionally or alternatively, the method can include, by the computer, centering the 3D gemstone model at an origin and aligning with the axes, four control points for a curve (0,a), (kappa*b, a), (a, kappa*b), (b,0).

In some instances, additionally or alternatively, for marquises gemstone models, the four quadrants are all approximately the same and fit into a two parameter family, with a parameter mu controlling curvature and a parameter theta, which controls an angle of a tangent line drawn at a tip of the 3D gemstone model.

In some instances, additionally or alternatively, for pear gemstone models, ellipse half is controlled with parameter kappa while the marquise half is controlled with parameter mu.

In another example embodiment, additionally or alternatively, a method of determining virtual facet depth distribution of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include determining and recording, by the computer, a number of ray-facet interactions for each virtual facet, defined to be combinatorial depth. The method can also include determining, by the computer, relative percentages of areas of high depth and percentages of areas of low depth.

In some instances, additionally or alternatively, the method can include, measuring, by the computer, physical length of a ray path for each virtual facet.

In some instances, additionally or alternatively, the method can include, by the computer, classifying the 3D gemstone model for fire based on the determined relative percentages of high depth and low depth.

In another example embodiment, additionally or alternatively, a method of determining virtual facet area distribution of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include grouping, by the computer, virtual facets in the 3D gemstone model according to predetermined thresholds of size. The method can also include determining a metric of total area of the grouped virtual facets.

In another example embodiment, additionally or alternatively, a method of determining contrast prominence of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include creating, by the computer, virtual facet decompositions from multiple angles. The method can also include determining, by the computer, angles of incoming rays with a horizon for each virtual facet for each beam trace. The method can also include determining, by the computer, whether any of the virtual facets are obscured based on a predetermined threshold of an incoming ray. The method can also include determining, by the computer, a total percentage area of obscured facets for each ray trace and creating an obscuration score based on the determined total percentage area.

In some instances, additionally or alternatively, the predetermined threshold of an incoming ray is 15 degrees or less.

In another example embodiment, additionally or alternatively, a method of determining scintillation score of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include creating, by the computer, virtual facet decomposition from multiple angles using the beam tracing. The method can also include plotting, by the computer, incoming rays for each virtual facet on a virtual hemisphere surrounding the 3D gemstone model. The method can also include determining, by the computer, a total area of all points within a predetermined set angular threshold for each point and dividing the determined total area by an area of the hemisphere. The method can also include determining, by the computer, a metric of how likely the 3D gemstone model is to exhibit scintillation based on the divided total area of all points and hemisphere.

In some instances, additionally or alternatively, the method can include, by the computer, determining the metric on a portion of the hemisphere to represent angles within an upper and lower bound from horizontal.

In some instances, additionally or alternatively, the method can include, by the computer, counting a number of virtual facets illuminated by a light source with fixed given angular threshold, for determining an average number of scintillation events for a randomly placed light source for each point in the hemisphere.

In some instances, additionally or alternatively, the method can include, by the computer, calculating total area of the virtual facets that are illuminated, and averaging, by the computer, the total area over the hemisphere area.

In another example embodiment, additionally or alternatively, a method of determining a light performance score of a gemstone is provided. The method can include receiving, at a computer with a processor and memory, data regarding a scanned gemstone. The method can also include generating, by the computer, using the received scanned gemstone data, a 3D gemstone model. The method can also include beam tracing, by the computer, the 3D gemstone model using geometry, refraction and reflection rules. The method can also include creating by the computer, virtual facet decompositions from multiple angles using the beam tracing. The method can also include calculating by the computer, an angle of incoming rays with a horizon for each virtual facet for each ray trace. The method can also include determining by the computer, whether each virtual facet is illuminated or not based in a previously defined lower and upper bound. The method can also include determining, by the computer, light return score for the 3D gemstone model based on a total percentage area of illuminated facets is returned for each beam trace.

In some instances, additionally or alternatively, the lower bound is 15 degrees and the upper bound is 45 degrees.

BRIEF DESCRIPTIONS OF THE DRAWINGS

The patent or application file contains at least one drawing executed in color. Copies of this patent or patent application publication with color drawing(s) will be provided by the Office upon request and payment of the necessary fec.

For a better understanding of the embodiments described in this application, reference should be made to the Detailed Description below, in conjunction with the following drawings in which like reference numerals refer to corresponding parts throughout the figures.

Figure 16C:
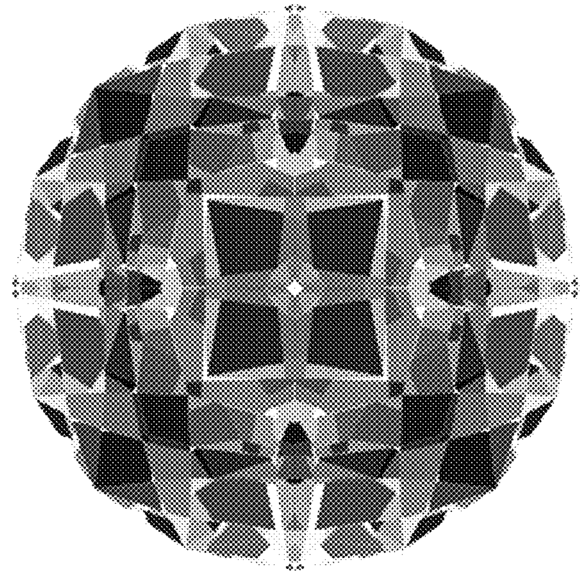
Figure 16B:
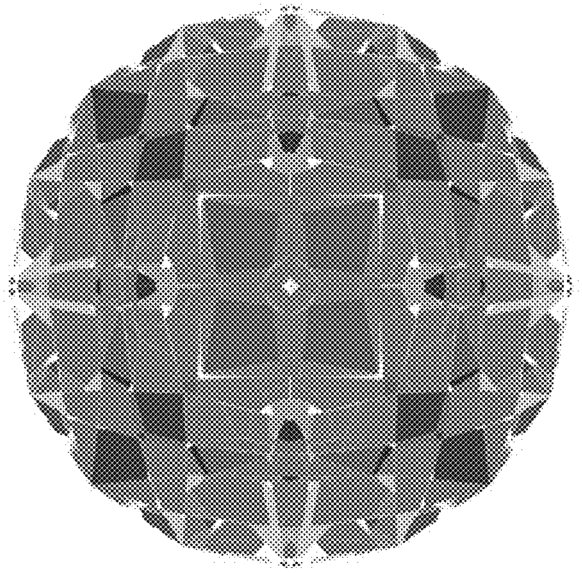
Figure 16A:
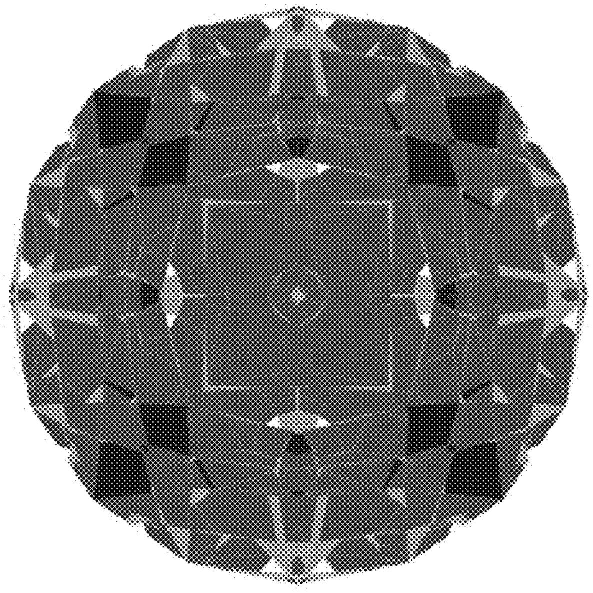
Figure 17:
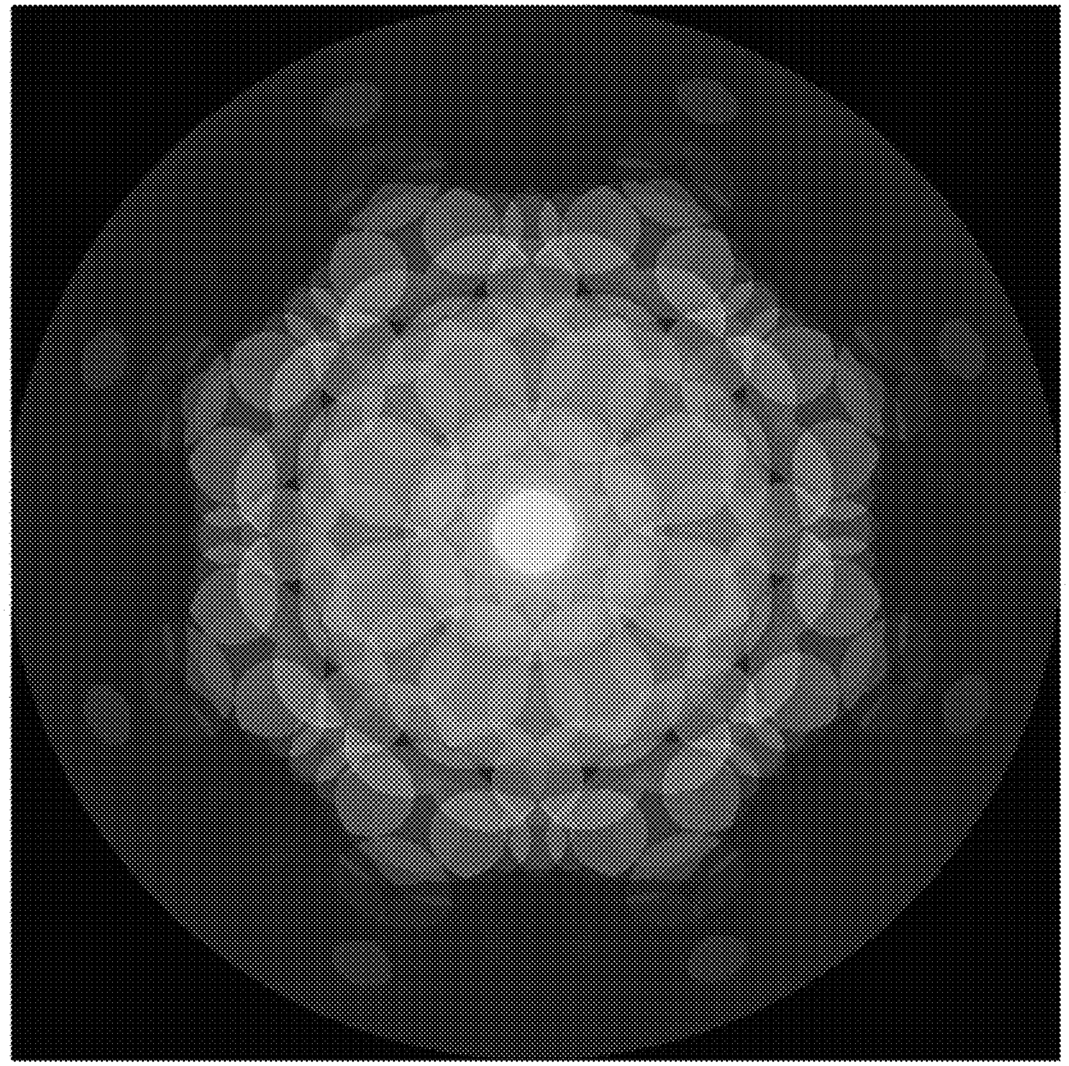
Figure 18:
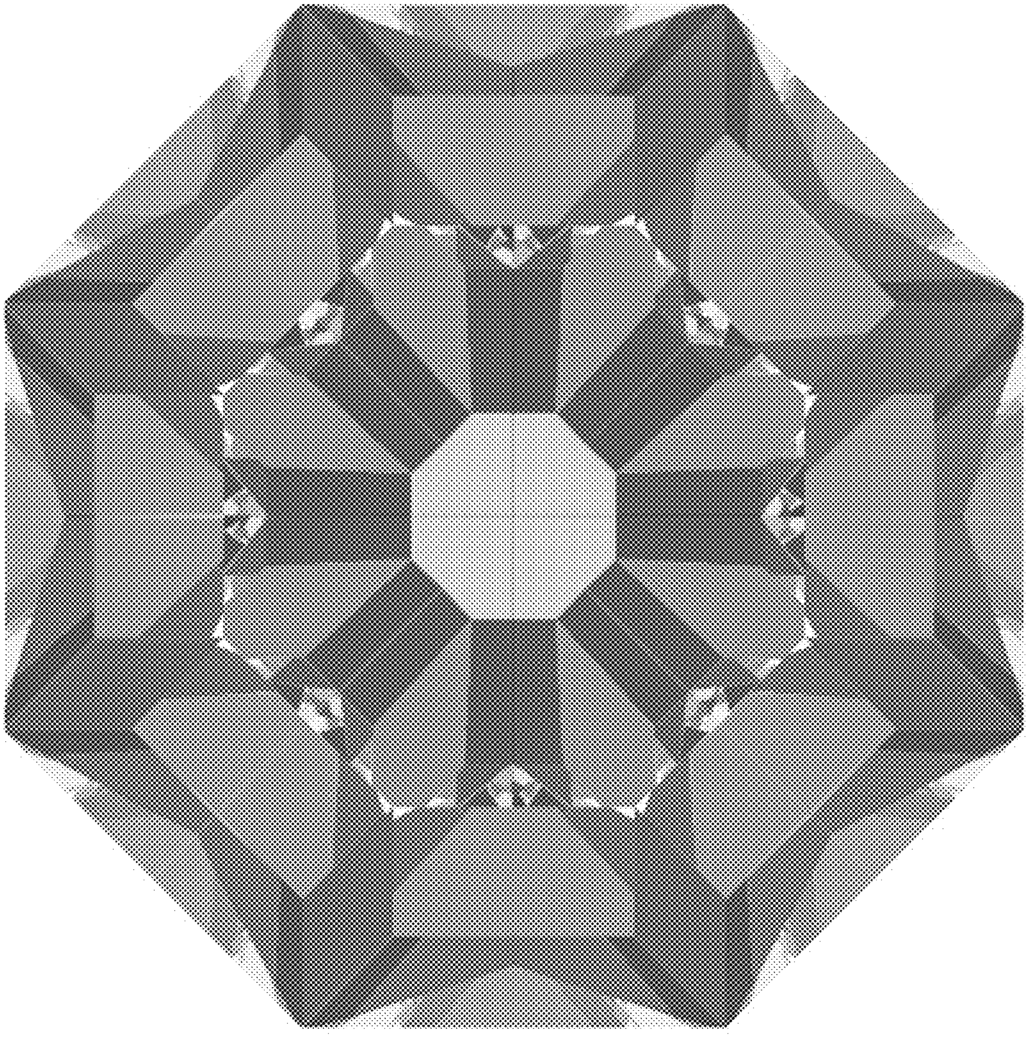
Figure 19:
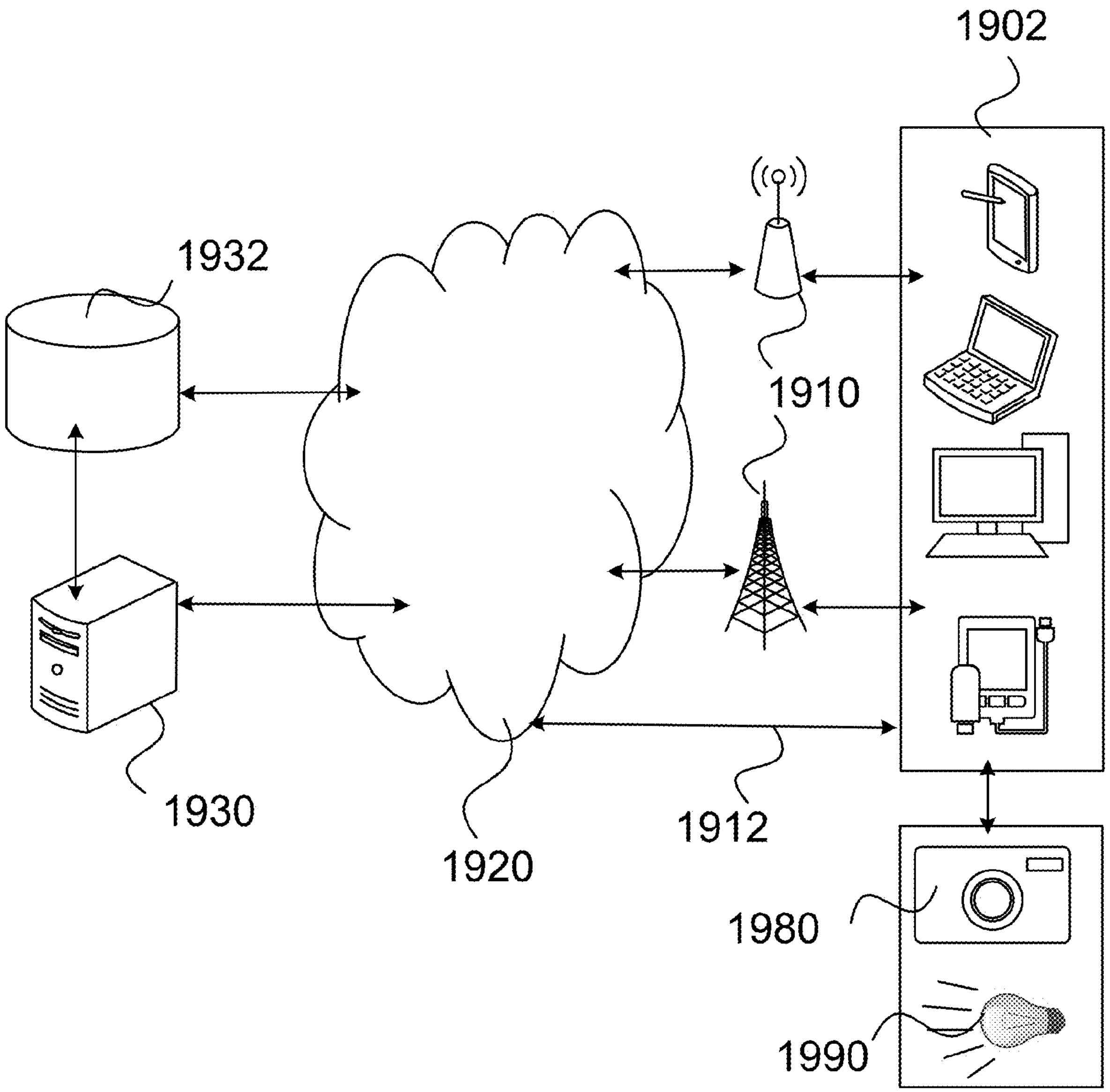
Figure 20:
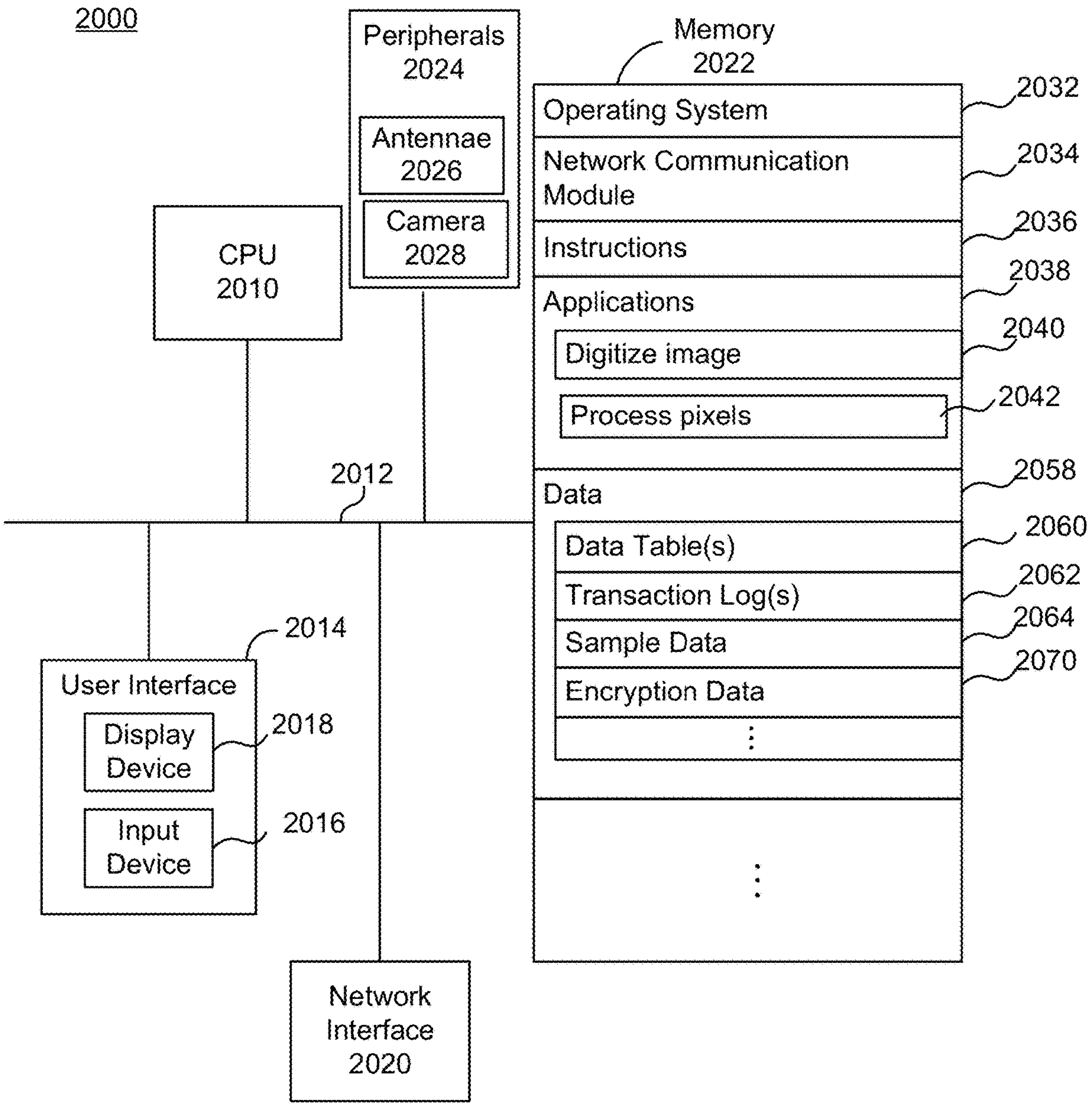

FIGS. 16A-C illustrate example normal, color gradient, and mono diamond evaluation images according to embodiments described herein;

FIG. 17 is an example sparkle spread map for a standard round brilliant diamond according to embodiments described herein;

FIG. 18 is an example optical entropy map of an octagonal diamond according to embodiments described herein;

FIG. 19 is an illustration of an example networked system in accordance with certain aspects described herein; and FIG. 20 is an illustration of an example computer system in accordance with certain aspects described herein.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

It should be noted that the use of the term diamond or gemstone is not intended to be limiting in this disclosure. As the systems and methods here work with and relate to rough and cut gemstones, natural or laboratory grown, including diamonds, the use of the terms interchangeably is for mere example and not to be limiting in any way.

Overview

The present embodiments relate to analyzing and presenting diamond appearance characteristics and generating various outputs of light models and computerized simulations derived from gemstone facets. Example outputs can include computerized models of visual light displays of virtual facet patterns that appear in a physical gemstone, at least in part due to reflections and refractions of light bouncing in and through physical facets of the gemstone.

Other example outputs can include using metrics derived from such models for consumer-facing diamond reports, an interactive, web-based encyclopedia of diamond cuts, and/or other interactive representation illustrating characteristics of facets of various diamonds as well as modeled light interactions with such facets. These techniques can leverage an enumeration algorithm that can be used to generate outputs as described herein.

The techniques as described herein can include analyzing a model of an actual physical gemstone or diamond, such as a three dimensional (3D) computer-generated model. The diamond can be scanned by various scanning hardware to produce the 3D model of the diamond such as silhouette scanning using computerized image capture. In some instances, the model can be produced using various 3D modeling or virtual gem cutting techniques. In some examples, a 3D model may be generated from a computer software arrangement and not generated from a scan of an actual, physical gemstone.

These models can be used to simulate light interaction within the model, within and through facets and virtual facets. Such techniques may be used to understand features of a diamond cut and light behavior that enters the gemstone at any of various angles or directions. Such light may produce visual light patterns in the gemstone appearance, discussed here as virtual facet patterns, that may be modeled on a computer simulation, data gathered from such models, and displayed to a user, changing and updated as the modeled light source is moved and directed at different parts and directions of the modeled gemstone. Such modeled Virtual Facet patterns may change depending on the viewing angle of the human eye or camera or modeled viewing direction. Some systems and methods here may be used to model and display a gemstone with a fixed eye position, to display which virtual facets will be illuminated if the light source direction moves.

Such features may be provided to a consumer or owner of a diamond, as well as for education on diamond appearance. An output can include an interactive encyclopedia that can provide insights into the characteristics of the diamond.

Such features can be used to score or grade gemstones and various light performance metrics based on the cut and light interaction as well as symmetry grades of the gemstones.

The present embodiments can also relate to cut optimization of software-based products and services. An example use case for the present techniques can include software-related products to support manufacturers as well as the equipment manufacturers who provide cut or re-cut planning equipment to factories. A technical challenge for providing cloud-based software solutions can be producing 3D wire-frame models fitting the physical constraints of the gem material from which they will be polished. In many cases, databases for unique facet arrangements of submitted diamonds can include thousands of unique designs (facet arrangements). For each possible facet arrangement, there can exist unique parameters which define the geometry of the diamond. These include parameters like table size, crown angle, girdle thickness, various ratios, and parameters that define the contour of the diamond.

Another aspect of the present embodiments can relate to virtual facet design and planning on a gemstone cut. As facets are cut on a particular gemstone, light that enters the gemstone from any of various angles and directions, can cause the appearance of the interior of the gemstone to change. The light does not merely pass through the gemstone but plays off of the facets, reflects, refracts, and bounces around to produce different patterns in the interior appearance. Such virtual facet designs are not merely a computer representation of a gemstone's facets in virtual space, but rather physical appearance of virtual facets within the gemstone to a human or camera observer in the physical space. Such virtual facets may be modeled and displayed, analyzed and categorized using the systems and methods described herein.

Another objective of the present embodiments can relate to educational, gemstone design, and cut report products for retailers, designers, consumers, etc. The present embodiments may be used to create an encyclopedia of gemstone cuts, which can be incorporated into a core curriculum and integrated into digital platforms to help protect and inform consumers. The techniques as described herein can be used with various devices to enhance diamond grading reports with compelling visualizations of diamond performance, as well as create consumer and trade facing education tools about diamond cut. The encyclopedia may also be used by users to research and create diamond designs that have not previously been cut.

Among the users for this tool, many diamond designers can be able to easily produce diamond designs with patterning or scintillation effects, to create unique, one-of-a-kind gem and jewelry designs. These custom designed diamonds can be submitted for grading, where they receive interactive digital reports, highlighting the unique design attributes. New terminology, scales, and other data can be used to understand diamonds that are all tied to cut education and standards.

Analytical Method Examples

The present embodiments can use analytical methods that evaluate diamond appearance based on ray or beam traced models of scanned or virtual diamonds. Virtual facet patterns may be facet patterns that appear in a cut gemstone that may include reflections, refractions, the actual facet cuts, and the combinations of these. The virtual facet patterns thus appear to a viewer when observed on the physical stone based on the light and the light interplay with the various actual physical facets on the stone. In some examples, the designer or gemstone cutter/polisher may cut specific facets in order to generate patterns, shapes, designs, or other artwork in gemstone in the virtual facets that appear under specific lighting conditions. These designs may be a central focus in the gemstone cut design.

In some examples, therefore, it may be useful to model not only the actual physical facet cuts to the gemstone but also to model the virtual facet patterns that would appear to an observer of the physical cut gemstone. Such modeling may be affected by the placement of light beams or rays shined on the gemstone from various angles or directions, different wavelengths, different intensities.

Figure 1:
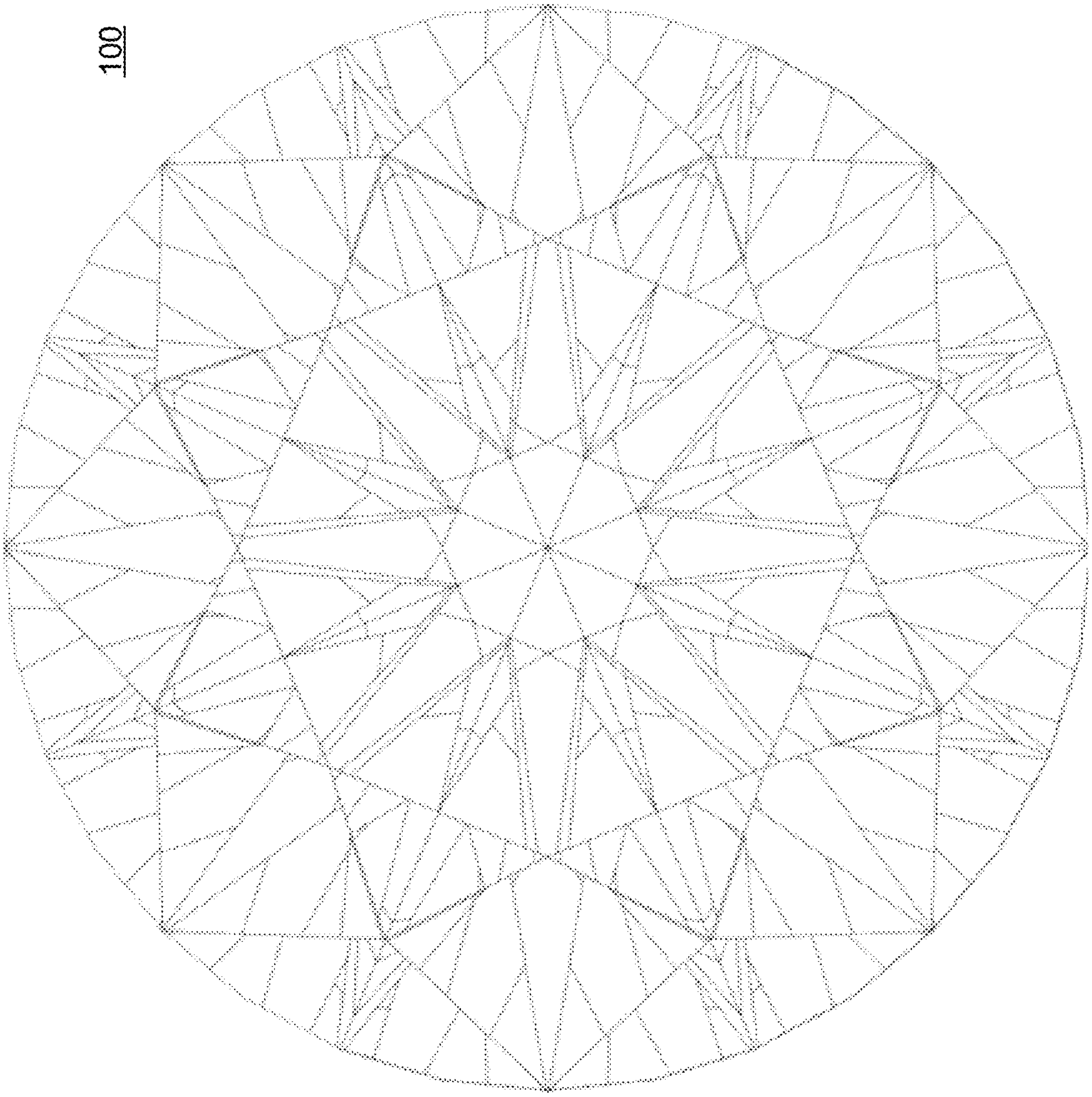
FIG. 1 is an example virtual facet pattern for a round brilliant diamond according to embodiments described herein.

The systems and methods as described herein can be used to model virtual facet patterns which may be derived from the ray or beam tracing techniques based on the physical facets patterns cut into a gemstone or modeled in a wireframe model of a gemstone. For instance, FIG. 1 is an image 100 of an example virtual facet pattern for a round brilliant diamond. Further, virtual facet patterns can be either derived from a computer-generated model and the facet cuts programmed into that or based on actual facet cuts of an actual physical diamond. Various scanning hardware techniques can be used to derive models of facet patterns of a physical diamond to generate models of virtual facet patterns as described herein. Further, various insights can be gleaned from the intersection points of light rays generated within a physical sphere or hemisphere surrounding a physical gemstone. The outcomes can be transformed into insightful graphical representations.

A component can include the calculation of the virtual facet pattern, based on the physical facets cut into a gemstone. For example, a polygonal decomposition of a gemstone or diamond surface is due to the refraction and internal reflection of light beams as they travel through, reflect, and refract around the physical gemstone facets. The virtual facet pattern can serve as a foundation for further analysis, as each virtual facet can correspond to a reverse traced beam exiting the diamond and striking a surrounding hemisphere. This information can form the basis for several analyses and visualizations.

Figure 10:
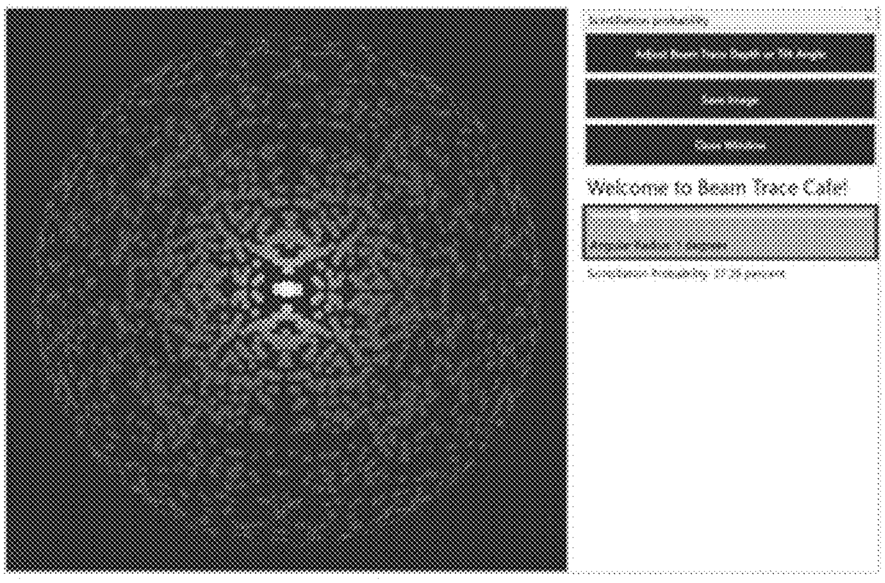
FIG. 10 is an example of the scintillation probability tool according to embodiments described herein.
Figure 11:
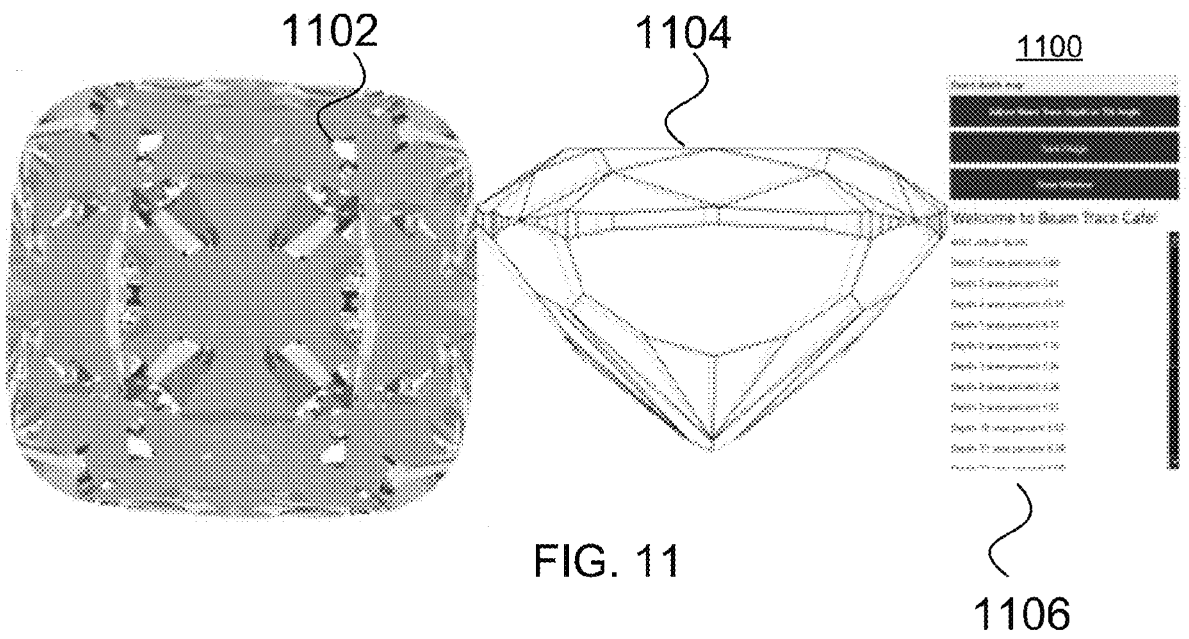
FIG. 11 is an example of the beam depth analysis tool according to embodiments described herein.
Figure 12:
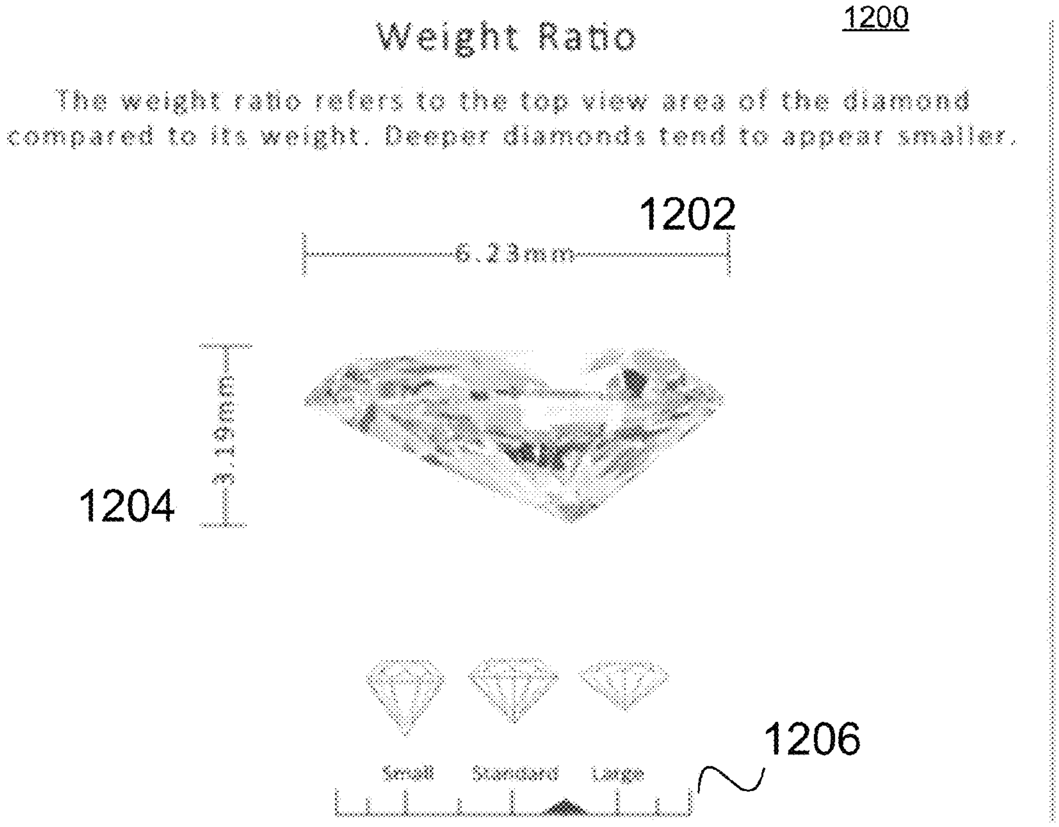
FIG. 12 is an example of the weight ratio chart according to embodiments described herein.
Figure 13:
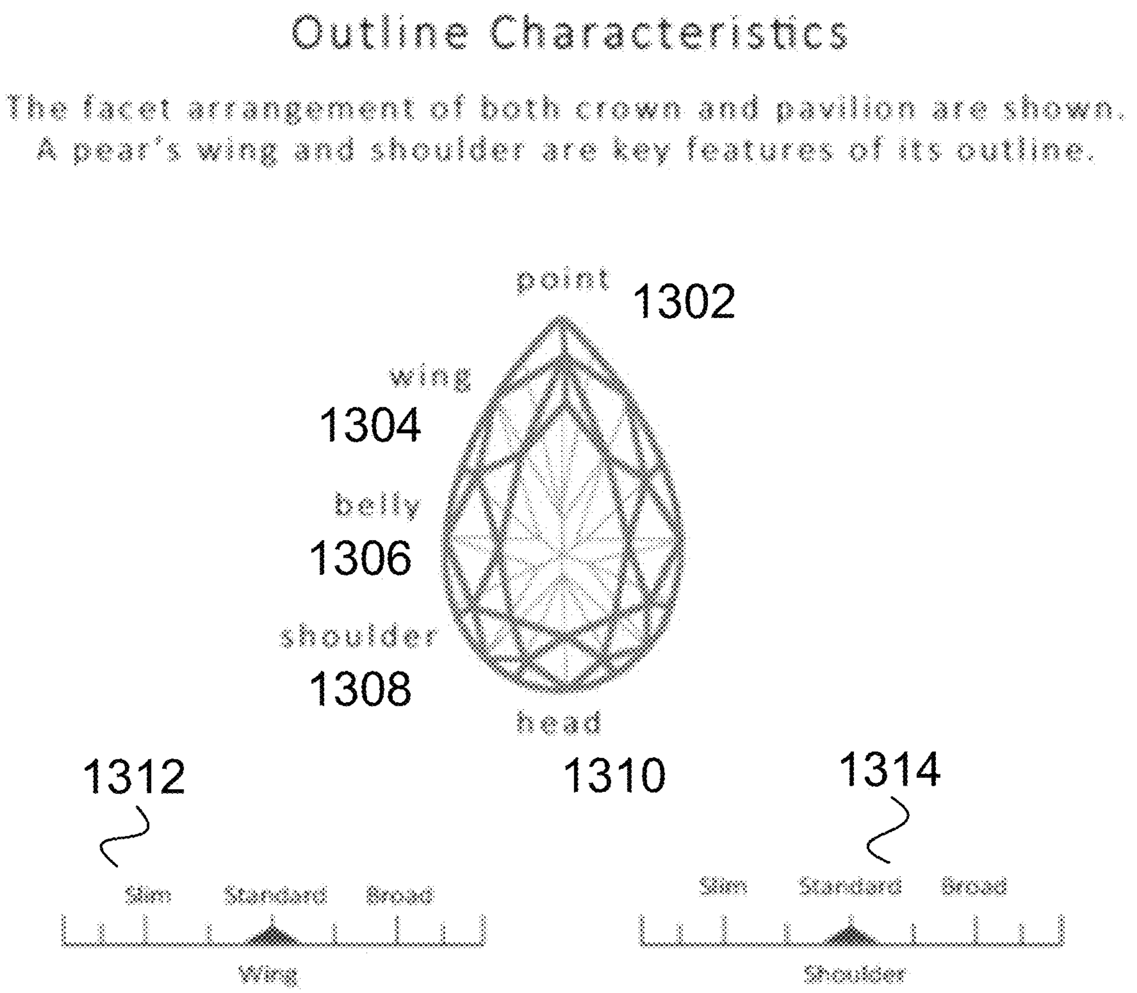
FIG. 13 is an example of the outline analysis chart according to embodiments described herein.
Figure 14:
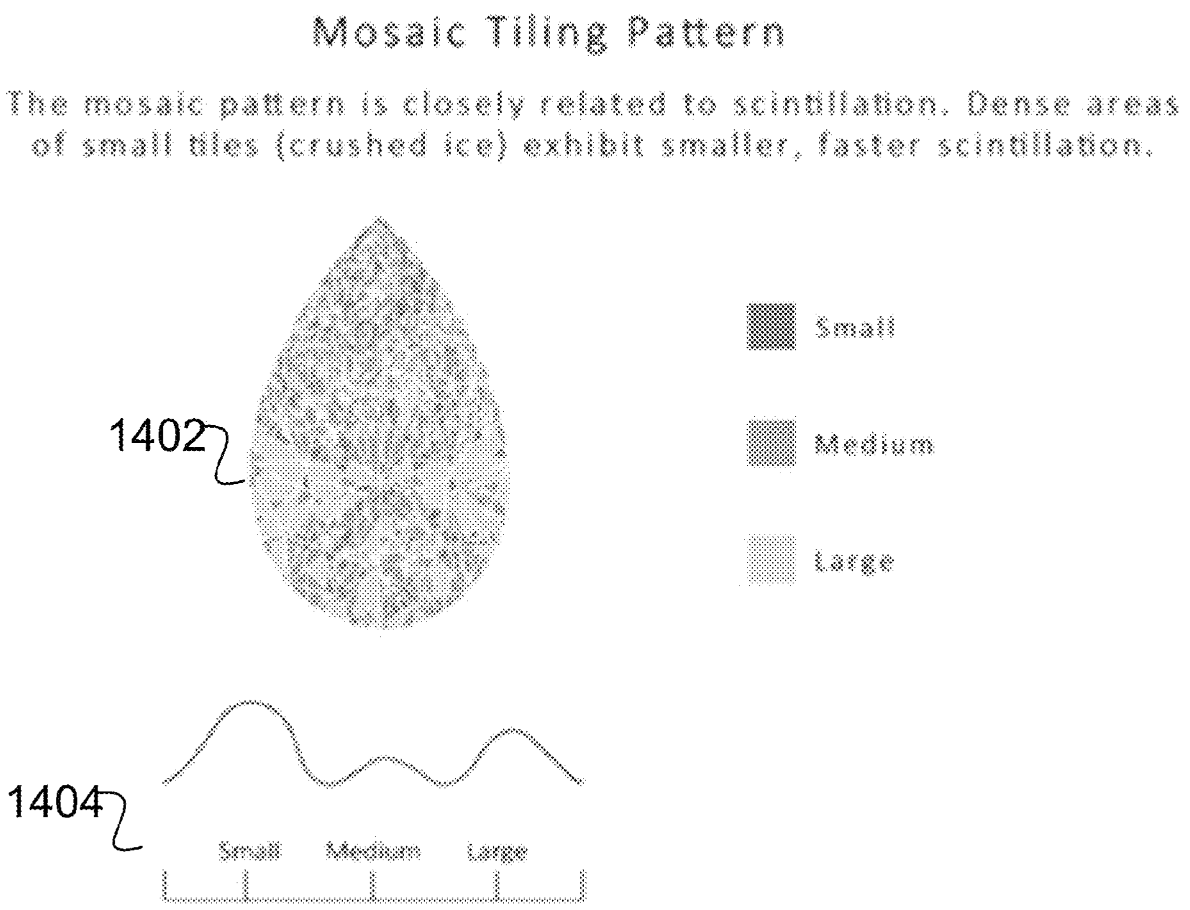
FIG. 14 is an example of the light pattern and virtual facet size chart according to embodiments described herein.
Figure 15:
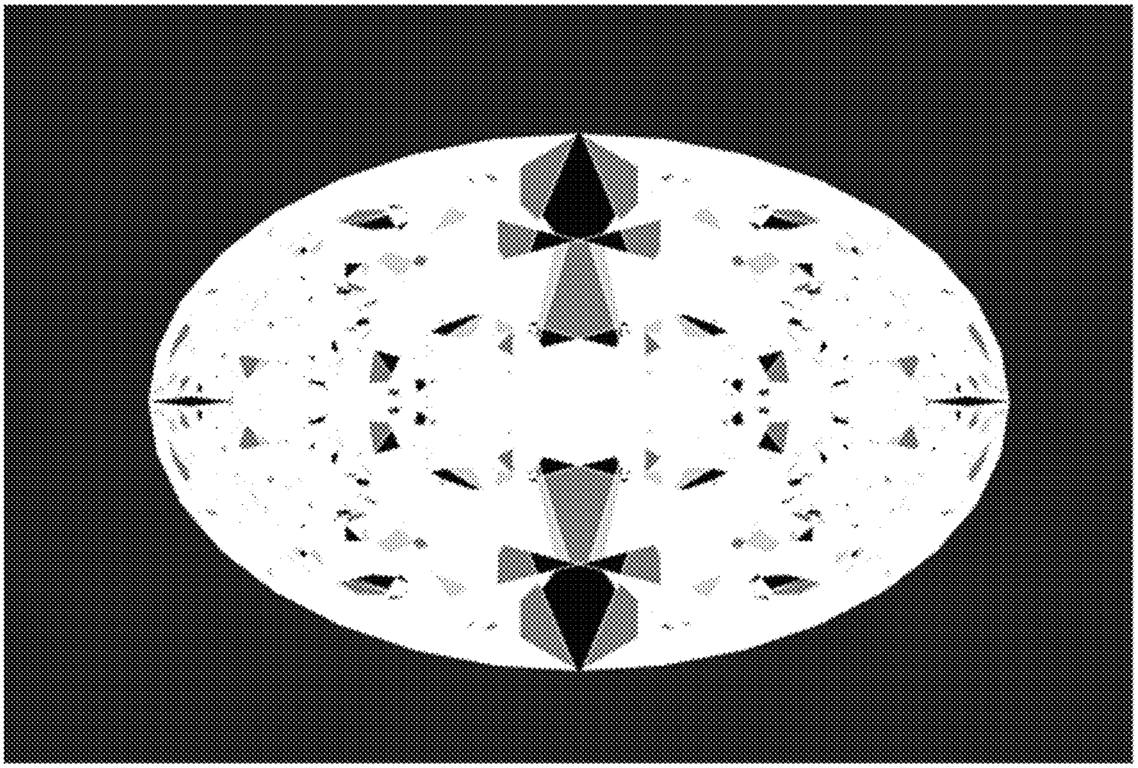
FIG. 15 is an example of the diamond contrast map according to embodiments described herein.

Various metrics can be derived from data collected from models of gemstones. Example metrics can include a light return, scintillation probability (e.g., 1000 as shown in FIG. 10), a contrast prominence (e.g., as shown in FIG. 15), a virtual facet area distribution (e.g., as shown in FIG. 14, a virtual facet depth distribution (e.g., as shown in FIG. 11), outline characteristics (e.g., as shown in FIG. 13), a weight ratio (e.g., 1200 with height 1202, width 1205 and a weight ratio chart 1206 as shown in FIG. 12), a symmetry score, etc. Other example metrics can include virtual facet comparison metrics, which can include an Isomorphism class, Hausdorff distance, graph edit distance, a crushed ice footprint, a bowtie analysis, a girdle reflection analysis, an optical entropy, a sparkle spread, and/or an optical symmetry score or virtual facet (VF) symmetry score.

Computerized simulations of various virtual facet arrangements may take into account many aspects of a gemstone facet design in order to model the virtual facet patterns that a user would see under different lighting conditions. Any combination of these aspects may be used in virtual facet modeling as described herein.

For example, light return can assist to measure how bright a diamond looks and may be a factor in measuring diamond quality. Further, scintillation probability can help to measure how likely a virtual facet is to catch a light source, to measure its sparkliness. Contrast prominence can indicate whether such contrast makes the diamond look dark or be an indicator of designs created by patterns of contrast, such as the classic hearts and arrows pattern as well as bow tie, a band of dark virtual facets across the belly of some stones.

Virtual facet area distribution can measure the crushed ice phenomenon without any judgment. Many small virtual facets can lead to what is called crushed ice, a pattern in the diamond that some consumers like and some may not prefer. Outline characteristics can include information to the consumer relating to the curvature of an outline of the diamond. Weight ratio can measure whether a diamond is presenting a reasonable cross-sectional area based on its weight. This can be to protect against manufacturers artificially inflating the carat weight even if the difference would not be visible. Symmetry score can include a quantification of symmetry of the diamond. Virtual facet comparison metrics can include metrics that allow researchers to search through diamond cuts to find ones where the patterning is as close as possible to a desired pattern.

Visual Score Examples

Light return can measure, using computer simulations, the percentage of light rays hitting the eyes of an observer that originate in an angular range where light sources tend to be. Light performance metrics has been used in many different solutions. Light return can be a measure of how bright a stone will appear.

An example process for generating a light return score can include scanning a gemstone using a non-contact measuring device. In some instances, the non-contact measuring device can provide various measurements of the gemstone to produce a 3D model. In other examples, the measurements and/or the 3D model can be obtained from another computing device.

The 3D model can be ray traced or beam traced to create a virtual facet decomposition from multiple angles. The ray trace can be accomplished by following a primary ray path from a grid of rays traveling backward through an eye, and interacting with the diamond through refraction and reflection, according to Snell's Law. A beam trace can perform this at the beam level, by tracing a bundle of parallel rays, and creating daughter beams in a tree data structure every time a beam hits a facet junction.

Each virtual facet can be a polygon in the image of the diamond representing a class of almost parallel rays that interact with the diamond and hit the observer's eye. The angle of the incoming rays with the horizon can be calculated for each virtual facet for each ray trace. Virtual facets with angles between a defined lower and upper bound can be considered illuminated. For example, virtual facets where the incoming light is from 15 to 45 degrees can be considered as illuminated. The total percentage area of illuminated facets can be returned for each ray trace, creating a light return score for the face up and tilted diamonds.

Scintillation scoring may relate to the probability distribution of one, two, three, or more of the virtual facets of a gemstone that can be illuminated, given a randomly placed light source. Such a probability distribution can be used in the scintillation scoring metric to determine the average quantity of scintillation events (e.g. sparkles) of a randomly placed source. More precisely, this metric may include analysis where each virtual facet corresponds to a point on the hemisphere. The scintillation scoring may be the probability that a light source that subtends x degrees can illuminate one of these points. The scintillation scoring can be calculated by considering the set of all points of distance less than x on the hemisphere from the virtual facet intersection points. The scintillation scoring can include the area of the x-neighborhood divided by the total hemisphere area. More generally, the scintillation scoring can be constrained to angles above the horizon where light sources tend to be.

An example process for scintillation scoring of a gemstone can include scanning the gemstone using noncontact measuring device or obtaining measurements of the gemstone to product a 3D model of the gemstone. The model can be ray traced or beam traced to create virtual facet decomposition from multiple angles.

The incoming ray for each virtual facet can be plotted on a virtual hemisphere surrounding the diamond. The total area of the set of all points within a set angular threshold of each point can be calculated and divided by the area of the hemisphere. The resulting scintillation score can provide a metric determining how likely a diamond is to exhibit a scintillation event.

In some instances, the calculation as described herein can be performed in a portion of the hemisphere described to represent angles within a set upper and lower bound from the horizontal. This can refine the scintillation score so that it only captures light sources within a restricted range of positions above horizontal. In some embodiments, in order to capture the average number of scintillation events for a randomly placed light source, for each point in the hemisphere, the number of virtual facets illuminated by a light source can be counted with a fixed given angular threshold. The average value can be taken over the hemisphere or a chosen subset. In some instances, the visual area of a scintillation event can be captured for each point in the hemisphere. The total area of the virtual facets that are illuminated can be calculated and averaged over the hemisphere or a chosen subset.

Contrast prominence can include a measure of what percentage of the light hitting the eye of an observer that originates close to vertical and will tend to appear dark in the stone when viewed.

An example process for determining a contrast prominence of a gemstone can include scanning the gemstone using noncontact measuring device or obtaining measurements of the gemstone to product a 3D model of the gemstone. The model can be ray traced or beam traced to create virtual facet decomposition from multiple angles. The angle of the incoming rays with the horizon can be calculated for each virtual facet for each ray trace using the geometry of the model and the physics of refraction and reflection. Virtual facets with incoming rays within a set angular threshold, such as 15 degrees, of vertical can be considered to be obscured. The total percentage area of obscured facets can be returned for each ray trace, creating an obscuration score for the face up and tilted diamonds. For example, a diamond may have 10 percent of its visual area obscured, a relatively small amount, or 40 percent, indicating a very dark diamond.

Virtual facet area distribution can include a list of the areas of the virtual facets, which can be further chunked into small, medium, and large.

A process for determining a virtual facet area distribution can include scanning the gemstone using noncontact measuring device or obtaining measurements of the gemstone to product a 3D model of the gemstone. The model can be ray traced or beam traced to create a virtual facet decomposition from multiple angles. Virtual facets can be grouped according to set thresholds into different sizes. The total area occupied by small facets can provide a metric that determines how much of the stone has crushed ice (i.e. a term used in the trade to refer to areas of a stone where the virtual facets are small and can have the optical effect similar to looking at crushed ice or shattered glass). The area distribution can provide a determination of the overall look of the stone.

Virtual facet depth distribution can include classifying diamonds by beam length and/or combinatorial depth. The beam length may be the apparent distance of the virtual facet from the eye, while combinatorial depth can measure the number of interactions (reflections and/or refractions) the beam had with the diamond surface. Diamonds with a higher percentage of low depth facets can have sharper virtual facet outlines. Longer beam lengths can be associated with more potential for dispersion (also known in the trade as fire). An example process for determining a virtual facet depth distribution can include scanning the gemstone using noncontact measuring device or obtaining measurements of the gemstone to product a 3D model of the gemstone. The model can be ray traced or beam traced to create virtual facet decomposition from multiple angles. The number of ray-facet interactions for each virtual facet can be recorded, which can be defined to be combinatorial depth. In some instances, the physical length of the ray path for each virtual facet can be measured. Relative percentages of area of high depth can give potential for more washed virtual facets as well as increased potential for fire. Percentages of area at low depth can give a metric of sharpness for the perceived pattern.

Outline characteristics can include analyzing a bulginess and other factors of a diamond outline. This can include finding best fit Bezier curves for 4 quadrants in the outline. For ovals, there can include a 1-dimensional family of Bezier curves that are fit to, indexed by a parameter $\kappa$. The value of $\kappa=0.55$ can give a perfect ellipse, while higher and lower values make the result either bulgier or pointier. For marquises, there can be two parameters. $\kappa$ can control the curvature of its wings, while an angle $\theta$ can control the angle of the two-pointed ends. Finally, pears can have three parameters, the curvature of the shoulder of the pair, $\kappa$, the curvature of wing, $\mu$, and the angle of the point, $\theta$.

A process for determining outline characteristics of a gemstone can include scanning a gemstone or obtaining measurements of the gemstone and producing a 3D model of the gemstone. The process can also include aligning a 2D shadow of the diamond. Aligning the shadow of the diamond can include, for each potential symmetry axis, computing the area of the convex hull of the shadow plus its reflection. The symmetry axis with minimum area can be selected, and the diamond can be rotated so that this axis is horizontal. Bezier curves can be fitted to the 4 quadrants of the diamond. For ovals, the curves may all be approximately the same. The curves can fit into a one parameter family from kappa=0 to kappa=1, with kappa=0.55 being an ellipse. The control points for the Bezier curve can be positioned a constant fraction kappa of the width and height of the outline. More specifically, if the stone is modelled so it is centered at the origin and aligned with the axes, the 4 control points for the curve can include (0,a), (kappa*b, a), (a, kappa*b), (b,0). For marquises, the 4 quadrants can also be approximately the same. The marquises can fit into a two-parameter family, with a parameter mu controlling the curvature (smaller mu means flatter) and a parameter theta, which can control the angle of a tangent line drawn at the marquise's tip.

Pears can have a marquise half and an ellipse half. The ellipse half can be controlled with parameter kappa while the marquise half can be controlled with parameter mu. A length to width ratio can be calculated as the difference in maximum and minimum x coordinates in the aligned diamond divided by the difference in maximum and minimum y coordinates. A pear can have two separate length to width ratios, one for the marquise half and one for the oval half, and also, separately, has a culet position.

A weight ratio can refer to the ratio of the top view area compared to its volume. Smaller weight ratios mean less visible diamond per carat. FIG. 11 illustrates an output 1100 for a weight ratio. The weight ratio can include identifying dimensions (e.g., 1102, 1104) of a diamond and determining a weight ratio via chart 1106.

An example process for generating a weight ratio for a gemstone can include scanning the stone and producing a 3D model of the stone. The process can also include uniformly scaling the dimensions of the model so that either the 2D footprint is a predefined fixed area or the weight is a predefined fixed weight. The area of the shape outline can be calculated with table facing up, divided by the volume of the diamond.

A symmetry score can be calculated by matching facets across lines of symmetry and calculating the deviation each facet has from a version of its matching facet reflected along the line of symmetry. The two facets can be overlaid and the symmetric difference of their areas is calculated. A score of 0 can indicate perfect symmetry.

Various metrics can be used to determine how closely related virtual facets patterns. A first example metric can include an isomorphism class. Two virtual facet patterns are said to be close if their abstract graph types are isomorphic. A process for determining an isomorphism class can include scanning the stone and producing a 3D model of the stone. The model can be ray traced or beam traced to create virtual facet decomposition from multiple angles. A virtual facet decomposition can be turned into an abstract mathematical graph consisting of nodes and edges. A similarity of two diamonds can be compared by checking whether there is a mathematical isomorphism between their virtual facet graphs.

Another example metric can include a Hausdorff distance. Two virtual facet patterns are said to be close if the Hausdorff distance between them is small (e.g., within 1 or 2 percent of the diamond's diameter). Hausdorff Distance can include a metric which is defined as follows. For each point x in the first set, let d(x) be the smallest distance from x to a point in the second set. Then the Hausdorff distance can be defined to be the maximum of all d(x).

A process for determining an Hausdorff distance can include scanning the stone and producing a 3D model of the stone. The model can be ray traced or beam traced to create virtual facet decomposition from multiple angles. A similarity of two diamonds can be compared by checking the Hausdorff distance of their virtual facet patterns. As an example, a Hausdorff distance can be used to maximize other performance metrics while keeping a virtual facet pattern as close as possible to a desired virtual facet pattern.

A graph edit distance can include a combinatorial definition of distance. This distance can be the minimum number of edits consisting of vertex and edge deletions or additions that are needed to get from one graph to the other. A process for determining a graph edit distance can include scanning the stone and producing a 3D model of the stone. The model can be ray traced or beam traced to create virtual facet decomposition from multiple angles. Virtual facet decomposition can be turned into an abstract mathematical graph consisting of nodes and edges. A similarity of two diamonds can be compared by computing the graph edit distance between their virtual facet patterns. As an example, a graph edit distance can be used to maximize other performance metrics while keeping the virtual facet pattern as close as possible to a desired virtual facet pattern.

A crushed ice footprint can include a measure of how much of the visible area of a diamond is occupied by crushed ice (a term for regions with small virtual facets). A process for measuring a crushed ice footprint can include scanning a gemstone and producing a 3D model of the gemstone. The model can be ray traced or beam traced to create virtual facet decomposition from multiple angles. The percentage of the virtual facet pattern occupied by small virtual facets can give a measure of the crushed ice footprint.

A bowtie analysis can include a metric for measuring the presence of bowtie, a band of obscuration across the belly of certain shapes such as pear and oval. A process for performing a bowtie analysis can include scanning a gemstone and producing a 3D model of the gemstone. The model can be ray traced or beam traced to create virtual facet decomposition from multiple angles. Virtual facets with obscuration that are in a band across the belly of the stone near the culet can be considered part of the bow tie pattern. The area of the bow tie can be calculated and outputted.

A girdle reflection analysis can include a measure of how much of the visible area of the diamond is spanned by light paths that reflect off the diamond girdle at some point. This area can be important as it represents areas of the stone where dirt on the girdle may become visible.

A process for performing a girdle reflection analysis can include scanning a gemstone and producing a 3D model of the gemstone. The model can bray traced or beam traced to create virtual facet decomposition from multiple angles. The primary ray path for each virtual facet can be analyzed to see whether it contacts the girdle at any point. If so, this virtual facet can be considered to have girdle reflection.

Optical entropy is a measure of combinatorial dispersion of light. It measures whether nearby virtual facets to a given virtual facet represent incoming light rays which are close to or far apart from the incoming light to the selected virtual facet.

A process for measuring an optical entropy can include scanning a gemstone and producing a 3D model of the gemstone. The model can be ray traced or beam traced to create virtual facet decomposition from multiple angles. A score can be assigned to each virtual facet as follows. Let n represent a unit vector in the direction of the reverse traced exit beam for the given virtual facet. For each neighboring facet f, consider the unit vector n(f) representing its reverse traced exit beam. Let A be the area percentage of the given virtual facet (2D area divided by total 2D area of all virtual facets) and let A(f) be the area percentage of the neighboring virtual facets. A score can be assigned which is the sum of the dot products A*A(f)*(Arccos(v1.DotProduct(v2))/PI). The larger this number is, the less spread out the neighboring facet. The total score can be the average score for each virtual facet. This can be defined to be the optical entropy.

Sparkle spread can be defined to measure the spread of virtual facets illuminated by a single light source. Given a light source, the centroids of facets that are illuminated can be computed, the convex hull can be calculated, and the area can be determined. Larger areas can correspond to larger spreads and enhanced sparkle. This can be computed over a grid of illumination within two chosen upper and lower bounds of polar angles in the upper hemisphere.

A process for measuring a sparkle spread can include scanning a gemstone and producing a 3D model of the gemstone. The model can be ray traced or beam traced to create virtual facet decomposition from multiple angles. A polar grid can be overlayed in an annulus in the upper hemisphere between the two chosen angles from the horizon. For example, the grid can be overlaid between 45 and 85 degrees, or from 0 to 90 degrees, etc. Each cell in the polar grid can be analyzed to determine which incoming light rays for virtual facets it intersects. The centroid for each such virtual facet can be calculated, and the convex hull of these can be formed. In some instances, the convex hull of the set of illuminated virtual facets rather than the convex hulls of their centroids can be calculated. The area of this polygon can be calculated, and the relative area (area of polygon divided by total visible area of diamond) can be computed. The average area can be computed over the polar grid, giving a sparkle spread score, measuring how distributed over the diamond a single light source tends to be.

In some examples, virtual facet modeling may be considered either source dependent or source independent. Source-dependent may mean that the coloring of virtual facets is (partially) determined by locations of source(s), thus enabling us to create maps with illuminated virtual facets. Source-independent may mean that the coloring of the virtual facets are completely independent of position/intensity of any particular sources.

Symmetry Score Examples

Figure 3:
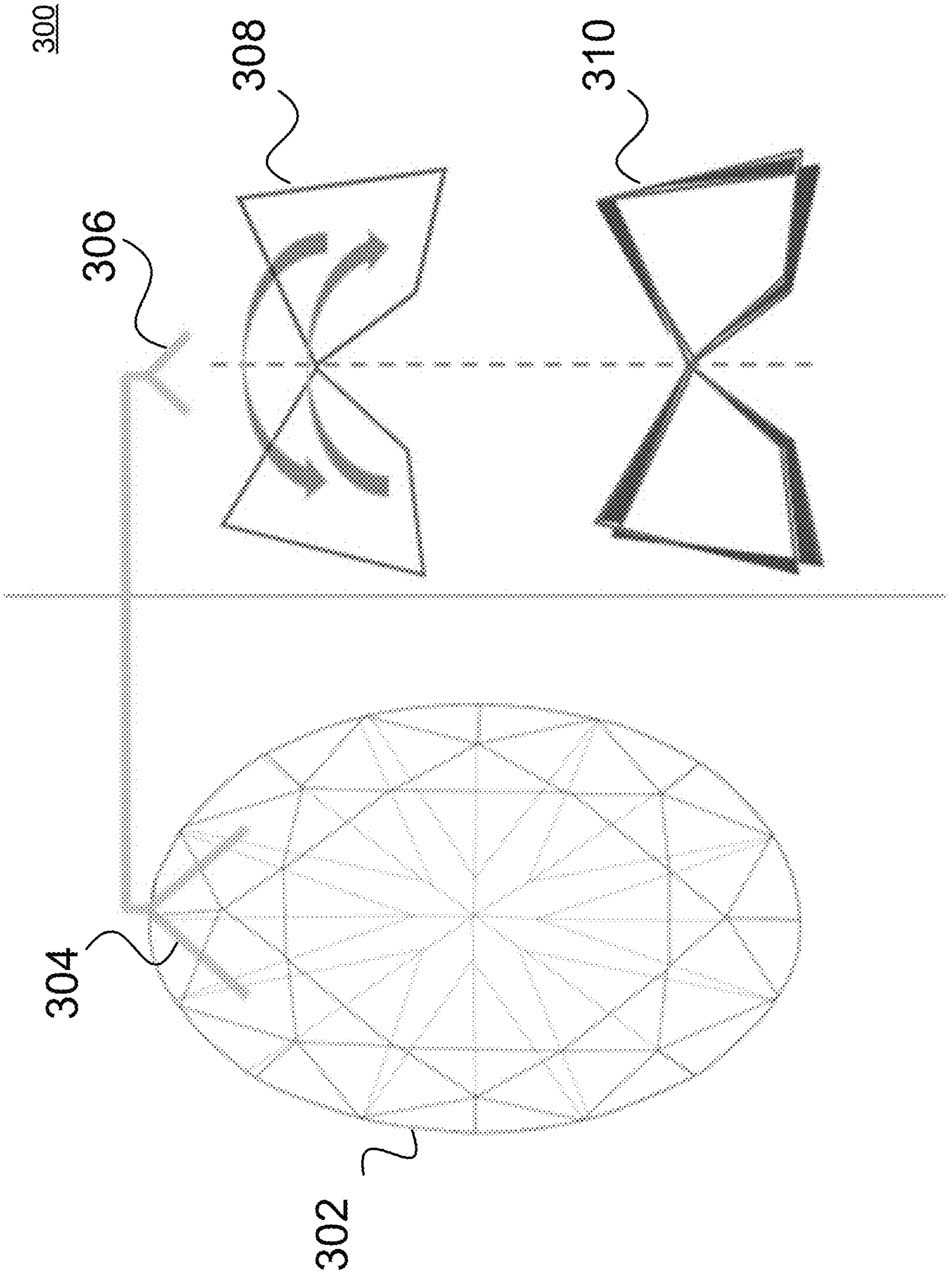
FIG. 3 is an example symmetry comparison according to embodiments described herein.

In some examples, Symmetry Scores may be useful in practicing the systems and methods described herein. Such a symmetry score may be useful in determining further metrics using modeled virtual facets. Of the Four C's (color, clarity, cut, and carat weight), cut may include a symmetry evaluation. In some cases, symmetry may be evaluated in the laboratories manually. Graders can evaluate the symmetry deviations visually by comparing size, shape, and orientation of the facets, facet edges, and facet junctions across appropriate lines of symmetry as shown in FIG. 3. Recently, there has been an effort to automate the evaluation of symmetry. This can be more easily done for Round Brilliant Diamonds with a consistent faceting arrangement as shown as an asymmetry image creation example in FIG. 4.

Figure 4:
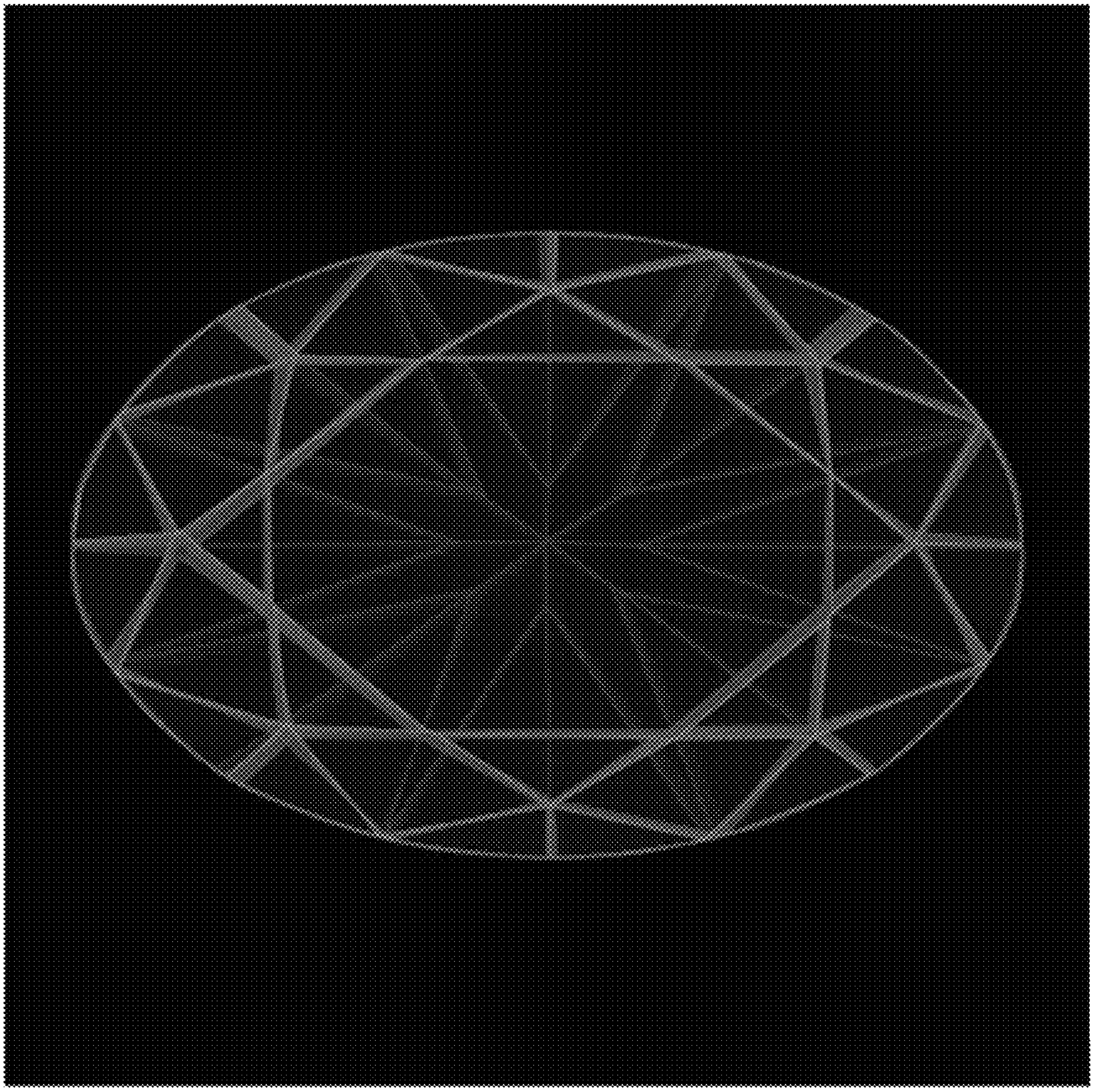
FIG. 4 is an example symmetry comparison according to embodiments described herein.

FIG. 3 is a first example symmetry comparison 300, and FIG. 4 is a second example symmetry comparison 400. As shown in FIG. 3, the symmetry 304, 306 between a first diamond image 302 and virtual facets 308, 310.

Many approaches at evaluation of symmetry deviations automatically are done by analyzing the deviation in traditional measurement parameters. Many of these measurements are not measuring the visual deviations directly, but rather the deviation in metric values are proxies for the actual visual defect the grader is evaluating. Measuring the maximum deviation of pavilion angle for example may be a good indicator that facet edges and junctions on the pavilion generally may not align across the eight (8) axis of symmetry for a round brilliant diamond. The fundamental disadvantage of this approach is that all the diamond facets may have to be identified and sorted such that appropriate comparisons can be made across the lines of symmetry as shown in FIG. 3. For a fancy shape, this approach can often be untenable because there are an infinite variety of facet arrangements possible for each gemstone shape as shown in FIG. 4.

A more direct approach can involve using a viewing device. A viewing device can be used to evaluate the symmetry aspect specifically and others include the symmetry evaluation as part of the pattern analysis ("Hearts-and Arrow" style viewers). Other viewers can measure various aspects of diamond appearance which may include aspects of symmetry.

Figure 2:
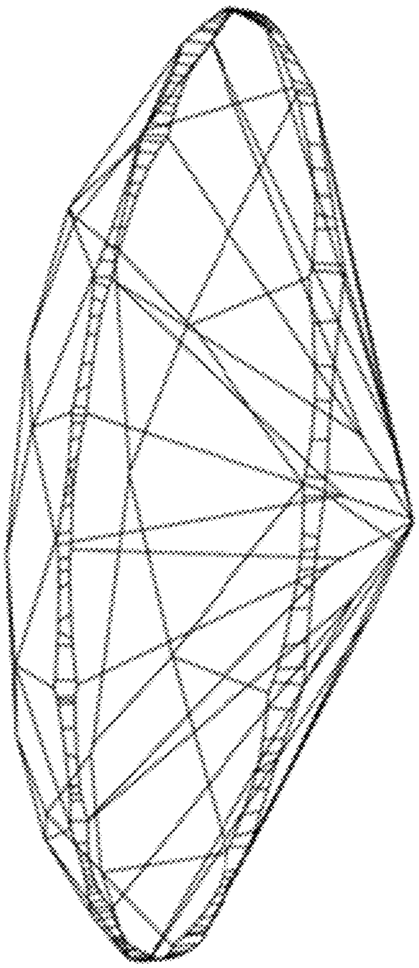
FIG. 2 is an example wireframe diagram according to embodiments described herein.

In some examples, rather than capture the symmetry aspects from the diamonds directly, an evaluation of a 2D or 3D model of the diamond may be utilized. To build a 3D model, the dimensions and angles of each facet can be captured as a 3D wireframe file as shown in FIG. 2 relying on a 2D representation of the model face-up.

For example, three-dimensional mesh-like files of gemstones may be used in a variety of applications but mainly for the purposes of measuring these potentially tiny objects with a high level of accuracy. These 3D files may be referred to as wireframes for example FIG. 2 showing a three-dimensional wireframe model example. FIG. 2 is an example wireframe diagram 200 according to embodiments described herein.

Systems and methods as described herein may be used to first convert the wireframes files as needed into various vertices and isolated lists of vertex indices which represent the faces, or facets of the given gemstone. These faces may be polygons existing in 3D space with at least three vertices. The wireframe files can inherently be face down in orientation as a result of the optical measuring system which captures the wireframe. The following steps may be taken for a wireframe file.

The steps can include converting XYZ points and vertex lists of facets if needed. The steps can also include flipping the wireframe to face up orientation by inverting X and Z coordinates. The steps can also include determining the convex hull of the gemstone in XY space. The steps can also include determining the centroid of the convex hull. The steps can also include shifting all points in XY space so that the centroid of the convex hull is at XY=0, 0. The steps can also include rotating the gemstone in XY space to desired orientation.

The result of this process can include a 3D gemstone wireframe that is considered face up. It can be rotated into a symmetrical orientation with the centroid of the XY outline at 0, 0. At this point, the process of assessing the symmetry of the facets can be.

The symmetry process can be performed along various axes of symmetry. The following process can be applicable to all axes of symmetry, however the vertical axis of symmetry may be used to describe the process. The vertical axis of symmetry can divide the gemstone into left and right halves.

The first step in the example process can include determining which pairs of facets will be compared along the axes of symmetry. Namely, if the gemstone were split along the axes of symmetry, it can be determined what pairs of facets should be compared against each other. Each facet's XY centroid can be determined, and the centroids can be bucketed by their XY placement relative to the axis of symmetry. All centroids which exist to the left of Y=0 (all centroids with a Y coordinates less than 0) can be considered to be on the left half of the gemstone. All centroids which exist to the right of Y=0 (all centroids with Y coordinates greater than or equal to 0) can be considered to be on the right half of the gemstone.

In some examples, the methods as described herein can be generalized from a facet-level analysis of the gemstone to a virtual facet analysis level analysis of the same diamond. In these embodiments, instead of comparing pairs of facets, pairs or groups of virtual facets are compared instead. The symmetry maps and analogous metrics correlate with what is generally regarded an optical symmetry, providing a methodology, for example, for assessing the symmetry characteristic of arrows in a standard round, or the symmetry of a bow-tie in fancy cuts exhibiting these patterns. Furthermore, the same virtual facet level analysis can be performed of the diamond in the face-down orientation, which can be needed, for example, to analyze the hearts patterning in a standard round brilliant and related shapes.

One example difference in the overall flow of the algorithm is that the diamond may first be ray-traced or beam-traced in the face-up and face-down orientations, to create the virtual facet maps for these orientations. These maps can then be used as input to the symmetry algorithms previously described.

Before any pairing is assessed, in some examples, certain facets may not be paired. One example of this is the table facet as there is only one table facet and it generally is intersected by the axis of symmetry. A computerized routine may be completed to identify these facets and they are removed as options for the following pairing algorithm, although they are still treated as pairs in later steps. These facets may be referred to as solo facets. Solo facets may be split into pairs by the following method:

If the solo facet is intersected by the axis of symmetry, the facet can be split into two polygons along the axis of symmetry and recognize as a pair. If the solo facet is not intersected by the axis of symmetry, the facet can be treated as "totally asymmetrical" and create a non-overlap polygon (described in following section) by inverting the solo facet across the axis of symmetry. The Euclidean distance in XY space between all facet centroids on the left of the axis of symmetry and all facet centroids on the right of the axis of symmetry can be calculated. The coordinates of the facet centroids on the right can be inverted along the axis of symmetry for this calculation in an effort to find the closest centroid for pairing on the opposite side. This distance matrix can then be sorted ascendingly.

The pair of centroids with the smallest Euclidean distance can be stored and those two facets can be removed from any further possible pairing. The extraction of smallest distance pairs can repeat until no possible pairs between the left and right halves exist. Any remaining unpaired facets can then be treated as solo facets. In some instances, a best-fit matching algorithm, such as the Hungarian Algorithm, can be used. With all pairs of facets identified, the asymmetry image creation can begin. The pairs of facets are inverted along the axis of symmetry and the symmetric differences between the original facets and their inverted counterparts are collected in the form of polygons of non-overlap. These polygons of non-overlap can then be overlaid onto an image of the original 2d face-up wireframe. The original wireframe is colored in green. Non-overlap polygons on the crown (the upper portion of the stone) are colored in red. Non-overlap polygons on the pavilion (the lower portion of the stone) are colored in blue. The entire process of overlaying symmetric difference can be completed for all axes of symmetry.

Figure 5:
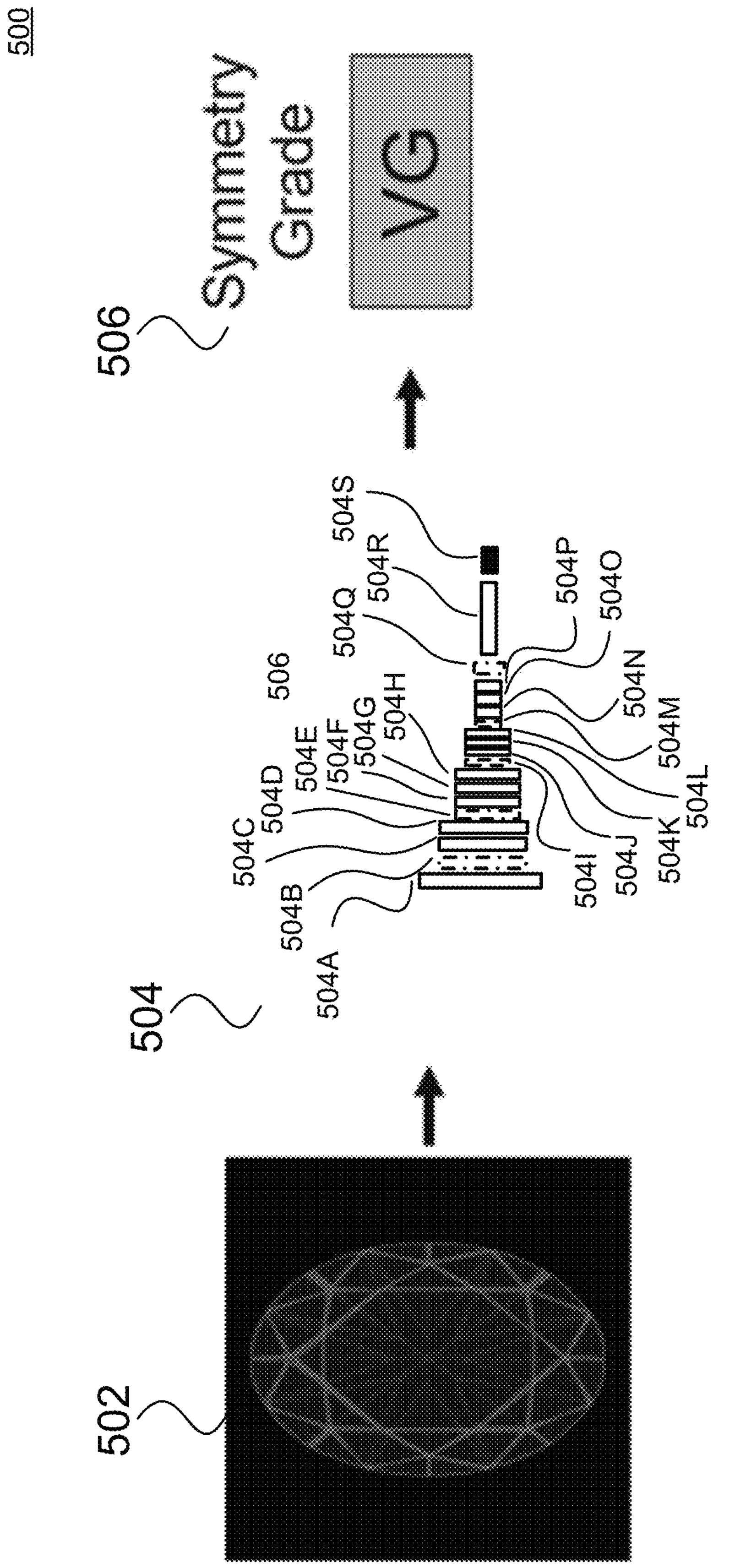
FIG. 5 is an example symmetry grading using neural networks according to embodiments described herein.

The final asymmetry image may be used as input for a pre-trained convolutional neural network which then produces a probability-based prediction as to the symmetry grade of the gemstone. FIG. 5 shows an example of this process with a convolutional neural network symmetry inference used to obtain a symmetry grade. As shown in FIG. 5, an image 502 can be fed into a trained neural network 504 to generate a symmetry grade 506. The trained neural network 504 can include a number of elements 504A-S, such as convolution+ReLU blocks (504A, 504C-D, 504F-H, 504J-L, and 504N-P), max pooling blocks (e.g., 504B, 504E, 504I, 504M, 504Q), fully connected-ReLU blocks (e.g., 504R), and softmax blocks (e.g., 504S).

The symmetry grade may include a total area of symmetric difference (non-overlap), potentially expressed as a percentage of the area of the outline. In this metric a gemstone with perfect symmetry can have a score of 0% and a stone with abysmal symmetry would have a score of 100% or greater as it is possible for the non-overlap area to exceed the area of the outline. This metric could further be sub-divided to measure the area of non-overlap on only the crown or only the pavilion.

Graphical Representations and Visual Modeling Examples

The analytical methods are complemented by various graphical representations, designed to translate complex gemological data into a format that is easily accessible and understandable to both experts and non-experts.

In some examples, sparkle patterning, or scintillation may be modeled using systems and methods as described herein. Such modeling may display what would be observed in darker environments with a few bright sources. The present embodiments may provide tools for demonstrating this patterning by selectively illuminating virtual facets for display. Another aspect of light performance is contrast patterning, which is typically viewed in uniform lighting environments, with regions of panorama blocked by a viewer.

The present embodiments may be used to model and display for any input gemstone cut wireframe, model, volume, etc. Example displays can include virtual facet patterns highlighted by virtual facet area (e.g., 1400 as shown in FIG. 14), virtual facet patterns highlighted by beam depth (e.g., 1100 as shown in FIG. 11), virtual facet patterns with edges highlighted by contrast (e.g., 1500 as shown in FIG. 15).

Figure 6:
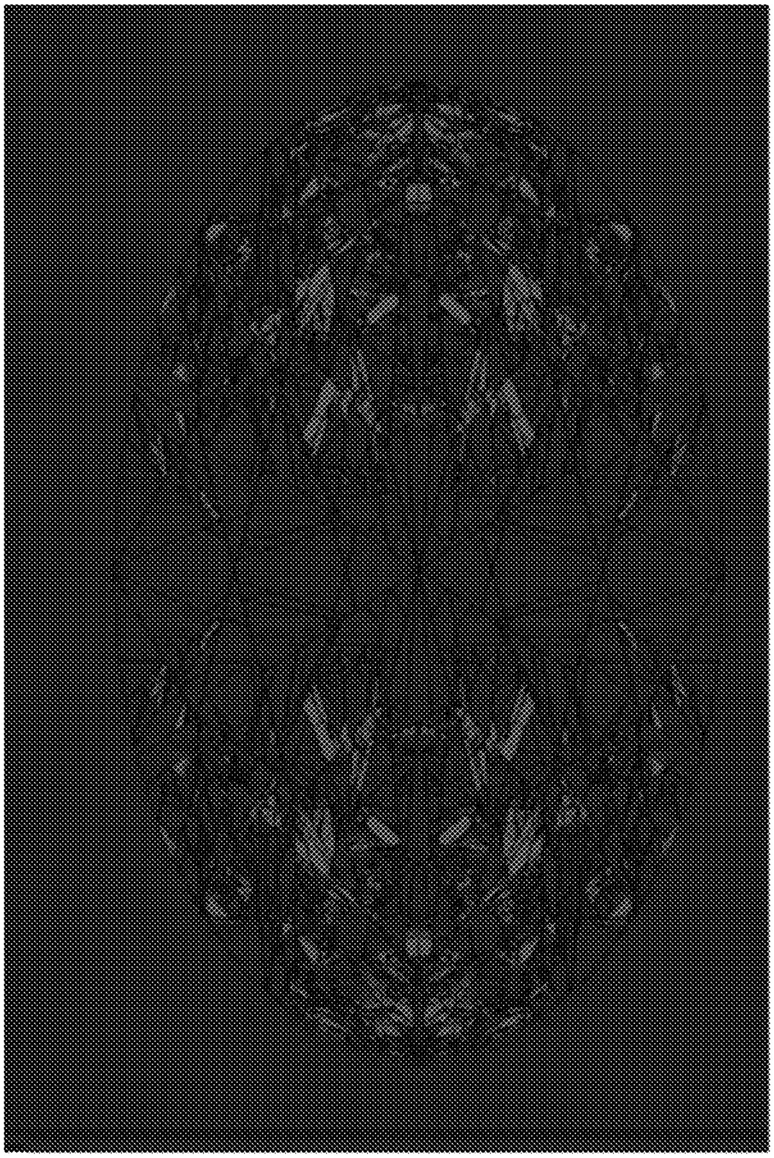
FIG. 6 is an example girdle interaction map according to embodiments described herein.
Figure 7:
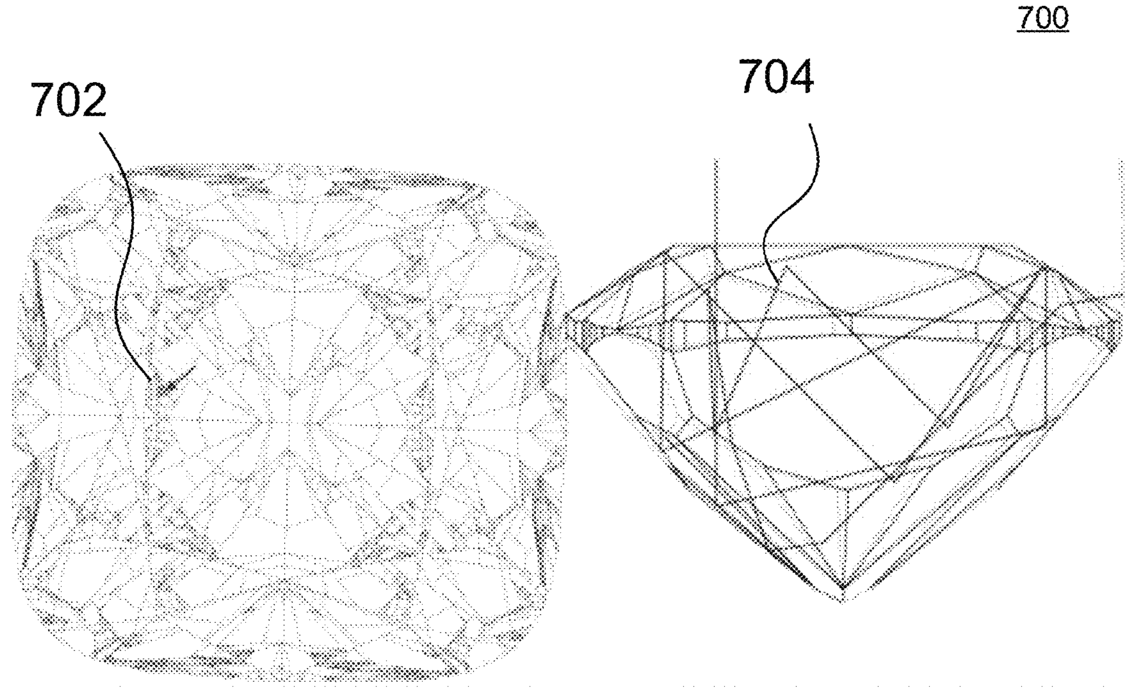
FIG. 7 is an example of the light path visualizing tool according to embodiments described herein.
Figure 8:
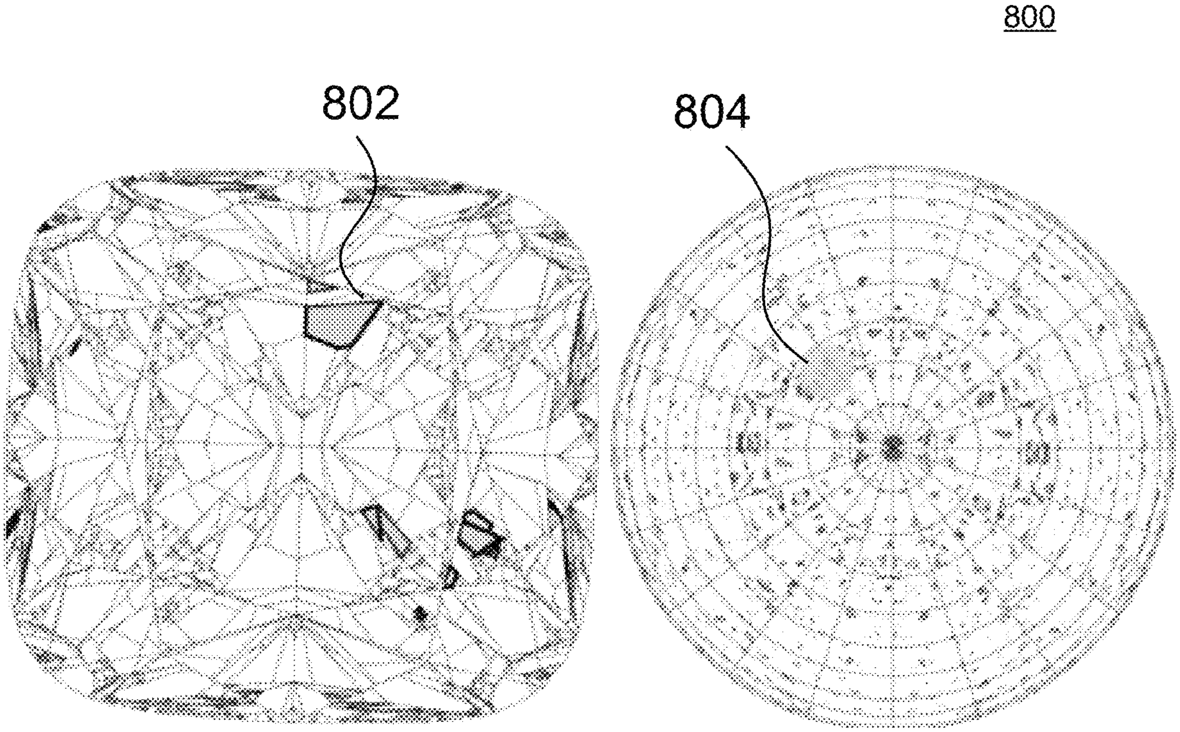
FIG. 8 is an example of the light source visualizing tool according to embodiments described herein.
Figure 9:
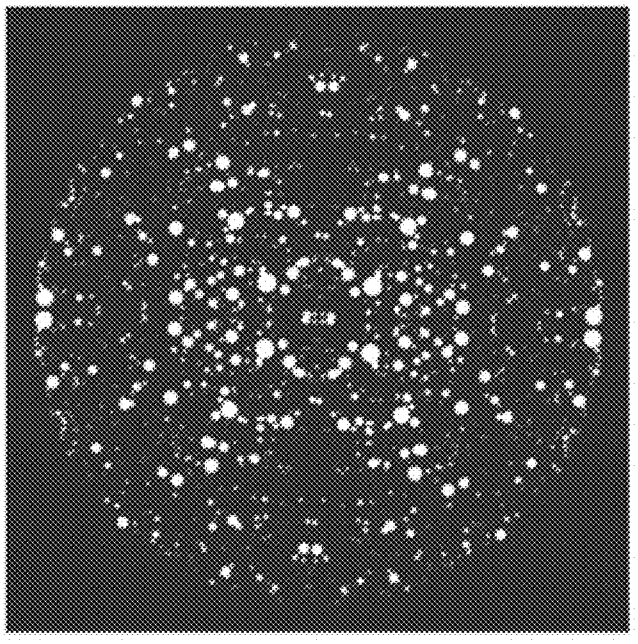
FIG. 9 is an example of the angular spectrum analysis tool according to embodiments described herein.

Other example outputs can include a symmetry map, an outline assessment (e.g., 1300 as shown in FIG. 13), an angular spectrum diagram (e.g., 900 as shown in FIG. 9), an isomorphism map, exit beam diagrams (e.g., 800 as shown in FIG. 8), an interactive light path and light source visualizer (e.g., 700 as shown in FIGS. 7 and 800 with virtual facets 802, 804 in FIG. 8), a contrast/sparkle demonstration tool, a girdle interaction map (e.g., 600 as shown in FIG. 6), an optical entropy map (e.g., 1800 in FIG. 18), a sparkle spread map (e.g., 1700 in FIG. 17), an optical symmetry map, or a VF symmetry map.

The virtual facet map can be the backbone of many of the techniques presented here. It can be displayed as a simple black and white image or with various elaborations on a computer user interface. A beam trace or ray trace can produce a list of virtual facets, each of which keeps a record of the reversed light path leading to it, as well as the exit path out into the surrounding hemisphere. The virtual facets can segment the view of the diamond into separate polygons, each with a unique ray path leading to it. The naked polygonal image without any colors or other marking can be referred to as the black and white outline virtual facet map.

The virtual facet map, with the reverse ray path for each virtual facet, and the exit beam where the reverse trace meets the virtual hemisphere, can represent a complete first order optical information for the diamond from the specified viewing position. The following analyses can all be derived from this data and so only need the ray trace or beam trace to be done once.

The model showing the black and white outline of the virtual facet pattern may depend on the viewer eye position with respect to the stone. The stone can be tilted and a different pattern can be seen. The light sources do not affect the outline. Choice of light source can affect how the virtual facets are illuminated, which can be important for a number of the tools and analyses.

Systems and methods may include using reverse ray/beam trace. Rather than start at a light source and follow all the light beams leaving the source, most of which never reach the observer eye, we reverse light paths from the eye, through the diamond, and back out into the world. Each virtual facet can represent a different light path from the eye into the world, which is modeled as a hemisphere surrounding the diamond, sometimes called the virtual hemisphere.

The tools that vary the light source can check which of those paths hit the light source in the hemisphere. This can include the light source analyzer, the sparkle/contrast tool, and a diamond evaluation map. Many of the other tools, such as the light path analyzer, start with a virtual facet and trace through where it ends up on the hemisphere.

FIG. 7 illustrates example outputs 700 for a tool for visualizing light paths corresponding to selected visual facets. As shown in FIG. 7, the output can identify facets 702 and light paths 704 for a diamond using the systems and methods described herein. The virtual facet pattern 702 can be displayed on the UI screen. The systems and methods can take input from a user, for example a mouse or other cursor position on the screen and use that as an indication of where a light source might be aimed at the facet pattern Then, systems and methods here may generate a virtual facet pattern, using the user input of light source to display the resulting light path (e.g., 704) based on this information.

For example, a process for determining light paths of a gemstone can include scanning the stone and producing a 3D model of the stone. The model can be beam traced by reverse tracing a beam through the stone using the geometry of the stone, and the physics of refraction and reflection. The virtual facet map can be displayed on one side of the screen. A profile of the 3D diamond model can be displayed on the other side of the screen. A user can move the mouse over different virtual facets and the corresponding light paths can be displayed within the 3D model.

FIG. 8 illustrates example UI displays or outputs 800 of a tool for visualizing virtual facets illuminated by a light source in a particular location. For instance, the systems and methods here may model which virtual facets are illuminated if a light source were to be shown or exposed to any particular direction or part of the gemstone. For examples, in FIG. 8, the user hovers a mouse or other UI interface pointer over a part of a model surrounding hemisphere which would surround a gemstone, and display the resulting exit beams which would be illuminated on the virtual facet map 802 of the gemstone itself. The user cursor or mouse hover would show where the light source direction is shown and the program can calculate which virtual facets are intersected by this light source, and then are lit up on the UI, thereby modeling the virtual facets that would be seen by a person viewing such a gemstone cut as the model is cut.

A process for calculating exit beams intersected by a light source can include scanning a gemstone and producing a 3D model of the gemstone. The model can be beam traced by reverse tracing a beam through the stone using the geometry of the stone, and the physics of refraction and reflection. The virtual facet map can be displayed on one side of the screen. A map of the virtual hemisphere indicating where the reverse traced exit beams hit the hemisphere can be created and displayed on the other side of the screen. A user can hover a light source with modifiable angular radius over the virtual hemisphere. The program can calculate which exit beams are intersected by the light source, and the corresponding virtual facets are illuminated in the virtual facet diagram.

The modeling of the virtual facets in FIG. 8, by modeling what the light would do from a hemispherical dome around such a gemstone may be recreated in the real world by physical parts. For example, a physical dome with many multiple arrays of different lights in different quadrants and sectors of the dome may be in communication with a computer. The computer may be programmed to illuminate certain lights in the dome which point at different angles toward the physical gemstone in the dome, to illuminate different virtual facet designs in the gemstone itself. In such a way, systems and methods here could be used to create a computerized model of the virtual facet illuminations by user input of light sources and/or the creation of a physical real space dome to house a gemstone in which light from different angles is shown into the gemstone in order to produce desired virtual facet designs for a physical real space user eye and/or camera.

Exit beam diagrams can include a diagram which models how the exit beam for each virtual facet intersects a simulated or real outer hemisphere. This can provide a visualization of how the diamond collects light from the environment. A process to produce a visualization can include scanning the stone and producing a 3D model of the stone. The model can be beam traced by reverse tracing a beam through the stone using the geometry of the stone, and the physics of refraction and reflection. The location of where each beam hits a virtual hemisphere can be plotted as an intersection of the beam with the hemisphere. This gives a spherical polygon, which can be seen at 804 of FIG. 8, for example.

FIG. 9 illustrates an example output 900 of a tool for visualizing the distribution of angles from which a diamond collects light and directs it to an eye of a viewer (Angular Spectrum). In FIG. 9, instead of the exact intersections of the beams being shown, circles with the same area can be shown.

A process for determining distribution of angles can include scanning the stone and producing a 3D model of the stone. The model can be beam traced by reverse tracing a beam through the stone using the geometry of the stone, and the physics of refraction and reflection. The location of where each beam hits the virtual hemisphere can be plotted as a circle of the same area as the virtual facet.

Further, FIG. 10 illustrates an example output 1000 of a tool for visualizing and calculating a probability of a scintillation event. In FIG. 10, the tool can look at the set of ray intersections with the outer hemisphere and calculate the set of all points that are within a specified angular distance. This can include looping over a radial grid.

A process for calculating a scintillation event can include scanning the stone and producing a 3D model of the stone. The model can be beam traced by reverse tracing a beam through the stone using the geometry of the stone, and the physics of refraction and reflection. The user can define an angular radius for a light source, for example 1 degree, or 2.1 degrees. The program can use a radial grid search to display the set of points which are within the specified angular radius of one of the exit beams. The area covered can represent positions of light sources of the given angular radius that would illuminate at least one virtual facet of the diamond. The relative area can provide the probability that a randomly placed light source of the given angular radius will illuminate at least one virtual facet. Additionally and alternatively, this tool can be further refined to be constrained to certain angles above the horizontal where light sources tend to be.

FIG. 11 illustrates example outputs 1100 for a tool for visualizing and calculating virtual facet depths. As shown in FIG. 11, virtual facets 1102 can be identified with depths of each virtual facet being represented in a representation of the diamond (e.g., 1104). The tool in FIG. 11 can use the same beam trace info by listing the number of interactions for each light ray.

A process for calculating virtual facet depths can include scanning a stone and producing a 3D model of the stone. The model can be beam traced by reverse tracing a beam through the stone using the geometry of the stone, and the physics of refraction and reflection. Each virtual facet can be colored based on the number of interactions the light ray path had with the diamond.

Additionally or alternatively, systems and methods here may include an angular spectrum evaluation tool (ASET) map. The ASET map can record the angle the exit beams make with the horizon and colors each virtual facet accordingly. Exit beams that originate within 15 degrees of vertical can give blue virtual facets. Exit beams that originate within 45 degrees of the horizon give green virtual facets, and exit beams that are in between, where light sources often are, are colored red. Exit beams that originate below the horizon corresponding to leakage, are either colored black, grey, or white. Analyzing the percentage of the ASET that is red, green, or blue can be useful for predicting visual characteristics such as brightness or contrast.

Other versions of the ASET have a continuous color gradient between the different colors so border cases are more easily understood. Another version of this is to use a monochromatic encoding. For example, one can take the $4^{th}$ power of the cosine of the angle with the vertical. FIGS. 16A-C illustrate views of example diamond evaluation images. For instance, FIG. 16A illustrates an example normal image 1600A, FIG. 16B illustrates an example color gradient image 1600B, and FIG. 16C illustrates an example mono diamond image 1600C.

A process for producing a visualization using ASET can include scanning the stone and producing a 3D model. The model can be beam traced by reverse tracing a beam through the stone using the geometry of the stone, and the physics of refraction and reflection. The polar angle of the exit beam for each virtual facet is calculated. The virtual facet can be colored according to either the ASET scheme, the continuous color gradient scheme, or the monochromatic scheme.

Such examples may be used to capture contrast phenomena. Virtual facets with exit beams originating close to vertical tend to be dark when a diamond is viewed face up, because the viewer's head is blocking these light paths. The dark pattern seen in the diamond is called contrast. In general, a little contrast can be necessary to make the diamond's pattern interesting, but too much can make the diamond seem too dark.

In standard round brilliant diamonds, the contrast tends to make a pleasing 8-fold arrow pattern. The related phenomenon in oblong shapes is sometimes called bowtie, the desirability of which is an aesthetic choice.

Contrast can be calculated by using a method similar to the ASET angular cutoff method and display virtual facets that have exit beams that are close to vertical as being dark. See FIG. 15.

This can lead to the virtual facet pattern colored by contrast map which can be used to predict bowtie or see the 8-fold arrows pattern in standard round brilliants. The 8-fold arrow pattern can be associated with a well cut round brilliant. Bowtie can be a term for contrast along a band in the middle of some fancy cuts. How much bowtie a consumer likes can be subjective, a tool can visualize it without labeling it bad or good.

Another use of virtual facets can be to model the phenomenon known as crushed ice. This is an optical effect noticed in some stones that is said to resemble what crushed ice looks like. Crushed ice can be represented as clusters of small virtual facets.

In order to represent the qualitative aspect of how the virtual facets look, including the crushed ice phenomenon, the virtual facets can be sorted into three categories: small, medium, and large. Then a color-coded map can be displayed in addition to a graph of the facet size distribution. See FIG. 14. This can lead to a virtual facet pattern colored by area map.

A virtual facet edge coloring chart may be constructed as follows. The wireframe model of the diamond can be assigned edge colors distinguishing types of edges: table, girdle and in between. A virtual facet diagram can be displayed that incorporates this color coding.

A process to produce a virtual facet edge color chart can include scanning the gemstone, producing the 3D model, and beam tracing the model by reverse tracing a beam through the stone using the geometry of the stone, and the physics of refraction and reflection. At each stage of the beam trace, the clipping edge for the polygonal regions can be recorded. A color coding for edge types can be utilized to create an edge-coded diagram.

Symmetry maps can include maps indicating deviations from symmetry determined by identifying pairs of facets that can match and displaying the deviation of the reflection through a colored region. This map can be used for AI training and may be referred to internally as a Symmetry map.

Outline analysis can analyze the bulginess as in the analysis section, with sliders to indicate severity or curvature. FIG. 13 illustrates an output 1300 for example outline characteristics. As shown in FIG. 13, a point 1302, wing 1304, belly 1306, shoulder 1308, and head 1310 for a diamond can be identified. Further, a wing outline chart 1312 and a shoulder outline chart 1314 can be shown. The output in FIG. 13 can be produced by modeling the boundary with Bezier curves and measuring their curvature.

A process for producing outline characteristics of a gemstone can include producing a 3D model of the gemstone and creating a 2D picture of the model via an alignment routine that uses the best fit axes of symmetry to align the diamond. In particular, pears, ovals and marquise shapes are lined up so that their long axis is horizontal. Bezier curves can be fit to the 4 diamond quadrants within the families of curves defined by parameters kappa, theta, and mu referred to previously. These parameters can be used as input to determine characteristics of the shape outline, fitting them into categories of slim, standard or broad. The relationship between contour parameters and the categories slim, standard, and broad can be defined via human observation and subsequent data analysis.

Additionally or alternatively, systems and methods here may include using virtual facet isomorphism maps. Virtual facet isomorphism space may refer to a partitioning of the proportion space of a diamond cut into regions labeled by graph isomorphism classes. Isomorphism maps may be two dimensional projections of this space color coded by isomorphism type or virtual facet number to create maps of virtual facet possibilities across different proportion sets.

A process for producing virtual facet isomorphism maps can include scanning a stone and producing a 3D model of the stone. Alternatively, a 3D model is created algorithmically. A set of models with different proportions like crown height, pavilion depth, table size, contour parameters can be created. The models can be beam traced by reverse tracing a beam through the stone using the geometry of the stone, and the physics of refraction and reflection. The space of all virtual facet patterns can then be segmented into smaller pieces, each representing a unique virtual facet type. This information can be depicted, for 2 or 3 parameter variations, either as a map with different regions colored by isomorphism type, or as a 3D plot colored by isomorphism type.

The girdle interaction map can include a visualization of which portions of the visible field of the gemstone arise from light rays that interact with the girdle in some way, either by reflecting off of it internally, or entering the diamond through it. This map is important for understanding where dirt or debris accumulating on the girdle will show up in the diamond's appearance. Light paths in diamonds will reflect off the inner surface of the diamond like a mirror if the angle of incidence is less than the critical angle given by Snell's Law. However, if there is dirt or debris on a facet, this can lead to a phenomenon known as frustrated total internal reflection, which causes that dirt to suddenly be visible along a light path that would have otherwise reflected. The girdle interaction map records virtual facets where girdle dirt may end up being visible.

A process for producing a girdle interaction map include scanning a stone and producing a 3D model of the stone. The model can be beam traced by reverse tracing a beam through the stone using the geometry of the stone, and the physics of refraction and reflection. Every virtual facet that has a light path that interacted with the girdle can be highlighted.

The optical entropy map (FIG. 18) is created using the concept of optical entropy. Virtual facets with neighboring facets that tend to collect light from similar directions are colored a light shade, while virtual facets with neighbors that collect light from dissimilar directions are colored a darker shade, with a continuous gradient of colors interpolating between the two extremes.

A process for generating an optical entropy map can include producing a 3D map and beam tracing the model by reverse tracing a beam through the stone using the geometry of the stone, and the physics of refraction and reflection. As before defined, a score for each virtual facet can be calculated using the areas of the virtual facets and the dot products of the exit beams with exit beams of neighboring facets. A continuous color gradient between blue and red can be created, coloring virtual facets whose score is negative red and those whose score is positive blue.

The sparkle spread map (FIG. 17) can include a map of the virtual hemisphere. An angular radius, say of 2 degrees is chosen. Each pixel of the face down view of the virtual hemisphere is colored as follows. Take a light source of the chosen angular radius and measure the relative area of the convex hull of the (centroids of the) illuminated facets. Color code each pixel using a linear color gradient from 0 (no virtual facets illuminated) to 1 (the illuminated virtual facets are spread as maximally as possible).

A process for generating a sparkle spread map can include generating a 3D model and beam tracing the model by reverse tracing a beam through the stone using the geometry of the stone, and the physics of refraction and reflection. A facedown view of the hemisphere surrounding the diamond is depicted. The user can select an angular radius in degrees for a modeled light source. Each pixel of the facedown view is colored as follows. The virtual facet exit beams can be viewed that the light source with the chosen angular radius centered on that pixel intersects. The convex hull of the centroids of these virtual facets can be selected, or alternatively, the convex hull of the virtual facets themselves. The relative area of the convex hull with respect to the total visible area of the diamond can be computed. The pixel can be color coded using a linear color gradient from 0 (no virtual facets illuminated) to 1 (the illuminated virtual facets are spread as maximally as possible).

Additionally and alternatively, rather than plot the area of the convex hull of the illuminated facets, the total area can be plotted, giving a heat map of the extent a light source is visible across the diamond's surface, or one can plot the number of virtual facets that are illuminated, giving a heat map of sparkle quantity as a function of light source position.

Finally, various interactive tools can be used that allow the user to explore the geometry of virtual facet patterns as they relate to optical paths.

Additionally or alternatively, systems and methods here may include a contrast/sparkle analysis tool that may be used in any combination or permutation, with some or all of the following examples. A first example can include displaying a virtual facet pattern model on a user interface and allowing user to input requests for example by clicking tiles (virtual facets) and choosing color for virtual facet tiles to create a single frame of a scintillation movie. The example can also include saving such a frame for adding into an over scintillation movie sequence. After x frames are selected the systems and methods here, for example, the algorithm may be used to solve for the unique sequence of lighting configurations in the hemisphere that creates the sequence of frames for the example movie. Virtual movies can be used showing interesting on/off patterns in the virtual facet pattern tiles. User interfaces may be used for creating actual illumination of gemstone with RGB dome, so virtual movies can actually be exhibited to a consumer with a physical gemstone.

FIG. 14 illustrates an output 1400 of an example virtual facet model. In FIG. 14, the virtual facet pattern 1402 can be closely related to scintillation, with dense areas of small tiles exhibiting smaller, faster scintillation. Further, a chart 1404 can show a virtual facet pattern and virtual facet size. The output in FIG. 14 can be produced using a ray trace as opposed to a beam trace. The virtual facets can be determined using various techniques. Then the area profile can be graphed, and the facets can be colored.

A process for generating a virtual facet model can include producing a 3D model of the store and beam tracing or ray tracing the model by reverse tracing a beam or set of rays through the stone using the geometry of the stone, and the physics of refraction and reflection. The virtual facets can be calculated and displayed. Each is colored by its relative size, small, medium or large, based on defined area percentage thresholds coming from human observation and categorization. The percentage areas of each (small, medium, and large) can be displayed. A graph can be displayed indicating the number of virtual facets in each category.

FIG. 15 illustrates an output 1500 for contrast prominence. In FIG. 15, the patterning can correspond to different contrast regions. Further, a chart can be used to highlight virtual facets with high angles of origin. The output in FIG. 15 can be produced with ray trace methods. Contrast can be calculated based on how close to vertical reverse traced exit rays are. Virtual facets in this range may be colored darkly. A score can be indicated on the bottom based on what percentage of the stone is dark.

A process for generating a contrast prominence output can include producing a 3D model and beam tracing or ray tracing the 3D model by reverse tracing a beam or set of rays through the stone using the geometry of the stone, and the physics of refraction and reflection. The virtual facet pattern can be calculated and the exit beam information for each virtual facet is analyzed. Virtual facets corresponding to incoming rays at high angles (close to vertical) are colored "Very Dark," e.g., with polar angle between 0 and 7 degrees. Those that are further from vertical, say from 7 to 15 degrees, can be colored dark. Those that are within, say 45 degrees of vertical, are colored slightly dark. Other virtual facets may not be colored.

Additionally or alternatively, systems and methods here may include an interactive, web-based encyclopedia of diamond cuts. This encyclopedia can be generated using a unique enumeration algorithm, which allows for the efficient creation of a comprehensive and detailed resource on diamond cuts. This can include an interactive tool providing various insights into diamond cuts. The encyclopedia as described herein can provide textual or visual representations of the metrics derived herein for each diamond cut type. For example, the encyclopedia can illustrate virtual facet tiling patterns, contrast performance, angular spectrum outputs, light return, light scintillation of the diamond, etc.

In such examples, pages corresponding to each diamond design can be generated algorithmically using various methods. Information as in the charts, maps, and analyses listed above may be included for each cut. Information and research about the most common diamond designs can be added. Users can be able to change diamond proportions and get calculated charts, maps, and data based on these changes.

Ideal 3D models for multiple diamonds are created using an enumeration algorithm. Models are optimized using metrics such as light return, contrast prominence, optical entropy, and so on. This optimization can be accomplished automatically using the constrained optimization by linear approximation (COBYLA) algorithm, a genetic algorithm, or another Machine Learning technique, or can be accomplished using human adjustment and analysis. Pages are populated with these diamond models, and visualizations of the diamond's performance such as the ones embodied herein can be displayed.

Implementation Examples

The present embodiments can be implemented using a combination of hardware and software components. Hardware components include scanning devices and computers, while the software components consist of ray/beam tracing and analysis software. A distributed web platform is recommended for hosting the interactive encyclopedia.

In a first example embodiment, a method for analyzing diamond appearance is provided. The method can include obtaining a 3D model file from a stone scan, or another scan that was created virtually. A diamond scan of a diamond (e.g., real diamond or virtual representation of a diamond) can be generated by a scanning device. The model can be generated by an analysis technique from the output from the diamond scan. A virtual scan can be obtained using scanning hardware or using other 3D modeling or gen-cutting software.

The method can also include running a ray or beam trace analysis of the stone, calculating a virtual facet pattern and exit beam information. The method can also include calculating metrics including any of light return, scintillation probability, contrast prominence (FIG. 9), virtual facet area distribution, virtual facet depth distribution, outline characteristics, weight ratio, symmetry score, graph Isomorphism class of the virtual facet pattern, Hausdorff distance of the virtual facet pattern to a specified graph, and/or graph edit distance of a virtual facet pattern to a specified graph.

After the set of metrics are calculated, they can be included in various outputs, such as a consumer facing report, or used to populate a page in the diamond encyclopedia. The metrics can also be used for research into optimizing cut design.

In some instances, the metrics are included on customer facing diamond reports. In some instances, the method includes producing content for a Diamond Encyclopedia.

Additionally or alternatively, systems and methods here may include representing diamond appearance can comprise any of a virtual facet pattern, and with elaborations colored by virtual facet area, colored by beam depth, with edges colored by type, colored by contrast, ASET and variations, as well as symmetry map, outline assessment, angular spectrum diagram, isomorphism maps, exit beam diagrams, interactive light path and light source visualizers, and contrast/sparkle demo tools.

Additionally or alternatively, systems and methods here may include a physical device is provided that surrounds a diamond with a hemisphere of light sources which is programmed to reproduce a selected pattern or sequence of patterns (movie).

Additionally or alternatively, systems and methods here may include a method for generating an interactive web-based encyclopedia of diamond cuts is provided. The method can include automatically generating a list of faceting arrangements up to a certain complexity, using the enumeration algorithm. The method can also include auto-populating with best guess proportion sets and displaying the charts and interactive content. The method can also include creating an interface for the user to adjust proportion sets and display newly calculated charts.

Additionally or alternatively, systems and methods here may include supplementing the automatically generated content by human created content for the most popular diamond shapes, including cutting guidelines to achieve desired properties. Additionally or alternatively, systems and methods here may include an interactive, web-based encyclopedia of diamond cuts, which can be generated by any of the methods described herein.

Network Examples

An example of a networked computing arrangement which may be utilized here is shown in FIG. 19. In FIG. 19, the computer 1902 used to process the image from the camera may generate data which includes pixel data of the captured images. The computer 1902 could be any number of kinds of computers alone or in combination such as those included with the camera itself, the light source itself, and/or another computer arrangement in communication with the camera and/or light computer components and in some examples, the stage motors and/or camera lens motors, including but not limited to a laptop, desktop, tablet, phablet, smartphone, or any other kind of device used to process and transmit digitized data. Such a computer 1902 may be used to control a camera 1980 and/or light generating device 1990 as described herein. The computer 1902, additional or alternative examples are described in FIG. 19.

Turning back to FIG. 19, computer resources for any aspect of the system may reside in networked or distributed format over the network 1920. Further, the data captured for the pixelated image from whichever computer 1902 may be transmitted to a back end computer 1930 and associated data storage 1932 for saving and analysis. In some examples, the transmission may be wireless 1910 by a cellular or WiFi transmission with associated routers and hubs. In some examples, the transmission may be through a wired connection 1912. In some examples, the transmission may be through a network such as the internet 1920 to the back end server computer 1930 and associated data storage 1932. At the back end server computer 1930 and associated data storage 1932, the pixelated image data may be stored, analyzed, compared to previously stored image data for creation of models, or analysis as described herein, or any other kind of image data analysis. In some examples, the storing, analyzing, and/or processing of image data may be accomplished at the computer 1902 which is involved in the original image capture. In some examples, the data storing, analyzing, and/or processing may be split between the local computer 1902 and a back end computing system 1930. Networked computer resources 1930 may allow for more data processing power to be utilized than may be otherwise available at the local computers 1902. In such a way, the processing and/or storage of image data may be offloaded to compute resources that are available on the network. In some examples, the networked computer resources 1930 may be virtual machines in a cloud infrastructure. In some examples, the networked computer resources 1930 may be spread across many multiple computer resources by a cloud infrastructure. The example of a single computer server 1930 is not intended to be limiting and is only one example of a compute resource that may be utilized by the systems and methods described herein.

Example Computer Devices

As described, any number of computing devices may be arranged into or connected with the various component parts of the systems described herein. For example, the camera systems may include their own computing systems, the lighting systems may include their own computing systems, the data from the camera images may be collected, stored and analyzed using computing systems. Such systems may be local and in direct connection with the systems described herein, and in FIG. 19. In some examples, some of the computing resources may be networked, or in communication over a network, such that they are not necessarily co-located with the optics systems described herein. In any case, any of the computing systems used here may include component parts such as those described in FIG. 20.

FIG. 20 shows an example computing device 2000 which may be used in the systems and methods described herein. In the example computer 2000 a CPU or processor 2010 is in communication by a bus or other communication 2012 with a user interface 2014. The user interface includes an example input device such as a keyboard, mouse, touchscreen, button, joystick, or other user input device(s). The user interface 2014 also includes a display device 2018 such as a screen. The computing device 2000 shown in FIG. 20 also includes a network interface 2020 which is in communication with the CPU 2020 and other components. The network interface 2020 may allow the computing device 2000 to communicate with other computers, databases, networks, user devices, or any other computing capable devices. In some examples, the method of communication may be through WiFi, cellular, Bluetooth Low Energy, wired communication, or any other kind of communication. In some examples, the example computing device 2000 includes peripherals 2024 also in communication with the processor 2010. In some examples, peripherals include antennae 2026 used for communication. In some examples peripherals 2024 may include camera equipment 2028. In some examples, computing device 2000 a memory 2022 is in communication with the processor 2010. In some examples, this memory 2022 may include instructions to execute software such as an operating system 2032, network communications module 2034, other instructions 2036, applications 2038, applications to digitize images 2040, applications to process image pixels 2042, data storage 2058, data such as data tables 2060, transaction logs 2062, sample data 2064, encryption data 2070 or any other kind of data.

Conclusion

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words comprise, comprising, and the like are to be construed in an inclusive sense as opposed to an exclusive or exhaustive sense; that is to say, in a sense of including, but not limited to. Words using the singular or plural number also include the plural or singular number respectively. Additionally, the words herein, hereunder, above, below, and words of similar import refer to this application as a whole and not to any particular portions of this application. When the word or is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the description pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method for generating virtual facet models of a gemstone, the method comprising:
- receiving, at a computer with a processor and memory, data regarding a scanned gemstone;
- generating, by the computer, using the received scanned gemstone data, a 3D gemstone model;
- receiving, by the computer, a user input regarding a lighting environment selection in relation to the 3D gemstone model and colors to an ideal hemisphere surrounding the 3D gemstone model;
- determining, by the computer, color and illumination of facets using models of exit beam data within the 3D gemstone model and a ray trace analysis of the 3D gemstone model and user input lighting environment selection, wherein determining the color of facets of the 3D gemstone model comprises assigning a color to each virtual facet based on a recorded angle of an exit beam from the exit beam data relative to a horizon of the 3D gemstone model; and
- causing display, by the computer, of virtual facet illuminations or facet colors on a user interface showing the 3D gemstone model.

2. The method of claim 1 wherein the lighting environment selection is at least one of a single or multiple tinted, or white light sources, or an arbitrary assignment of light intensities.

3. The method of claim 1 further comprising, causing display, by the computer, of an animation of the virtual facet illuminations or facet colors based on a programmed sequence of lighting environments.

4. The method of claim 3 wherein the programmed sequence of lighting environments includes at least one of a model of a moving light source, or a model of colored rings moving concentrically away from a hemisphere pole of the model.

5. The method of claim 1 wherein the lighting environment selection models a full illumination of a hemisphere surrounding the gemstone model with a selected darkened portion in order to model obscuration and contrast.

6. The method of claim 1 further comprising, by the computer, analyzing contrast prominence of virtual facets in the 3D gemstone model using the models of exit beam data.

7. A system for reproducing targeted virtual facets in a real gemstone, comprising:

a processor; and a memory with instructions that, when executed by the processor, cause the processor to perform steps comprising:

obtaining data relating to a scanned gemstone;

generating, using the obtained scanned gemstone data, a 3D gemstone model;

determining a virtual facet pattern and first exit beam data from a ray trace or beam trace analysis of the 3D gemstone model and an input viewing direction;

assigning a color to each virtual facet of the 3D gemstone model based on a recorded angle of an exit beam from the first exit beam data relative to a horizon of the 3D gemstone model; and causing display of the determined virtual facet pattern on a user interface showing the 3D gemstone model, the assigned color, and the determined virtual facet pattern.

8. The system of claim 7, wherein the determined virtual facet pattern is aligned to a selected angle of visual perception by utilizing facet depth information.

9. The system of claim 7, wherein the determined virtual facet pattern is aligned to a selected angle of visual perception by utilizing actual virtual facet size from the 3D gemstone model.

10. The system of claim 7, wherein the determined virtual facet pattern is aligned to a selected angle of visual perception by utilizing angles from the 3D gemstone model from which the virtual facet draws light.

11. The system of claim 7, wherein the steps further comprise, causing display of virtual facet elaborations on the user interface.

12. The system of claim 11 wherein the virtual facet elaborations include at least one of, virtual facets colored according to area, virtual facets colored according to beam depth, virtual facet edges colored by type, or virtual facets colored according to girdle interactions.

13. The system of claim 7, wherein the steps further comprise:

calculating a set of metrics from the determined virtual facet pattern and the first determined exit beam data, the set of metrics including at least one of: a light return, a scintillation probability, a virtual facet area distribution, a virtual facet depth distribution, an optical entropy, a sparkle spread, a graph Isomorphism class of the virtual facet pattern, a Hausdorff distance of the virtual facet pattern to a specified graph, or a graph edit distance of the virtual facet pattern to a specified graph.

14. The system of claim 13, further comprising:

using the calculated metrics to produce multiple diagrams of virtual facet patterns by generating a list of faceting arrangements by complexity, using an enumeration algorithm;

determining best proportion prediction sets;

causing display of charts of the multiple diagrams of virtual facet patterns; and receiving instructions to adjust proportion sets of the virtual facet patterns, and causing display of charts based on the received instructions.

15. A computer-implemented method for generating virtual facet models of a gemstone, the method comprising:

receiving data regarding a scanned gemstone;

generating, using the received scanned gemstone data, a 3D gemstone model;

determining a virtual facet pattern and first exit beam data from a ray trace or beam trace analysis of the 3D gemstone model and an input viewing direction;

assigning a color to each virtual facet of the 3D gemstone model based on a recorded angle of an exit beam from the first exit beam data relative to a horizon of the 3D gemstone model; and causing display of the determined virtual facet pattern and virtual facet elaborations on a user interface showing the 3D gemstone model, the assigned color, and the determined virtual facet pattern.

16. The computer-implemented method of claim 15, wherein the determined virtual facet pattern is aligned to a selected angle of visual perception by utilizing facet depth information or by utilizing actual virtual facet size from the 3D gemstone model.

17. The computer-implemented method of claim 15, wherein the determined virtual facet pattern is aligned to a selected angle of visual perception by utilizing angles from the 3D gemstone model from which the virtual facet draws light.

18. The computer-implemented method of claim 15, wherein the virtual facet elaborations include at least one of, virtual facets colored according to area, virtual facets colored according to beam depth, virtual facet edges colored by type, or virtual facets colored according to girdle interactions.

19. The computer-implemented method of claim 15, further comprising, by the computer, calculating a set of metrics from the determined virtual facet pattern and the first determined exit beam data, the set of metrics including at least one of, light return, scintillation probability, virtual facet area distribution, virtual facet depth distribution, optical entropy, sparkle spread, graph Isomorphism class of the virtual facet pattern, Hausdorff distance of the virtual facet pattern to a specified graph, or graph edit distance of the virtual facet pattern to a specified graph.

20. The computer-implemented method of claim 19, further comprising:

using the calculated metrics to produce multiple diagrams of virtual facet patterns by generating a list of faceting arrangements by complexity, using an enumeration algorithm;

determining best proportion prediction sets;

causing display of charts of the multiple diagrams of virtual facet patterns;

receiving instructions to adjust proportion sets of the virtual facet patterns; and causing display of charts based on the received instructions.

* * * * *